US012411540B2

(12) United States Patent
Swearingen et al.

(10) Patent No.: US 12,411,540 B2
(45) Date of Patent: Sep. 9, 2025

(54) SYSTEMS FOR COLLABORATIVE INTERACTION USING WEARABLE TECHNOLOGY

(71) Applicant: Ohio State Innovation Foundation, Columbus, OH (US)

(72) Inventors: Eunkyoung Swearingen, Columbus, OH (US); Scott Swearingen, Columbus, OH (US); Susan Thrane, Weaverville, NC (US); Asimina Kiourti, Columbus, OH (US); Balaji Dontha, Columbus, OH (US); Ian Williamson, Kansas City, MO (US)

(73) Assignee: Ohio State Innovation Foundation, Columbus, OH (US)

( * ) Notice: Subject to any disclaimer, the term of this patent is extended or adjusted under 35 U.S.C. 154(b) by 0 days.

(21) Appl. No.: 18/275,754

(22) PCT Filed: Feb. 3, 2022

(86) PCT No.: PCT/US2022/015077
§ 371 (c)(1),
(2) Date: Aug. 3, 2023

(87) PCT Pub. No.: WO2022/169949
PCT Pub. Date: Aug. 11, 2022

(65) Prior Publication Data
US 2024/0118743 A1 Apr. 11, 2024

Related U.S. Application Data

(60) Provisional application No. 63/145,082, filed on Feb. 3, 2021.

(51) Int. Cl.
*G06F 3/01* (2006.01)
*G06F 3/0487* (2013.01)
(Continued)

(52) U.S. Cl.
CPC ............ *G06F 3/011* (2013.01); *G06F 3/0487* (2013.01); *A63F 13/212* (2014.09); *A63F 13/533* (2014.09); *G09B 5/02* (2013.01)

(58) Field of Classification Search
CPC ........ G06F 3/011; G06F 3/014; G06F 3/0487; A63F 13/212; A63F 13/533; G09B 5/02
See application file for complete search history.

(56) References Cited

U.S. PATENT DOCUMENTS 9,427,664 B2  8/2016 Shah
9,795,884 B2  10/2017 Short et al.
(Continued)

FOREIGN PATENT DOCUMENTS

WO   2014186537 A1   11/2014

OTHER PUBLICATIONS

International Searching Authority (ISA/US). International Search Report and Written Opinion. PCT Application No. PCT/US2022/015077. Issued on May 12, 2022. 10 pages.
(Continued)

*Primary Examiner* — Ryan A Lubit
(74) *Attorney, Agent, or Firm* — Meunier Carlin & Curfman LLC

(57) ABSTRACT

Described herein are systems for collaborative interaction using wearable technology. An example system includes a wearable sensor configured to sense a collaborative interaction event, a microcontroller including a wireless transceiver, where the microcontroller is in operable communication with the wearable sensor, and where the microcontroller is configured to receive a sensor signal from the wearable sensor, and transmit, using the wireless transceiver, the sensor signal. The system also includes a computing device in operable communication with the microcontroller. The computing device includes a processor and a
(Continued)

memory, the memory having computer-executable instructions stored thereon that, when executed by the processor, cause the processor to: receive the sensor signal from the microcontroller; analyze the sensor signal to detect the collaborative interaction event; and generate a control command in response to detecting the collaborative interaction event, where the control command is configured to manipulate an object within a gaming environment.

18 Claims, 37 Drawing Sheets

(51) Int. Cl.
   *A63F 13/212* (2014.01)
   *A63F 13/533* (2014.01)
   *G09B 5/02* (2006.01)

(56) References Cited

U.S. PATENT DOCUMENTS

| | | | |
|---|---|---|---|
| 2016/0005338 | A1* | 1/2016 | Melendez-Calderon ..................... G09B 23/32 434/262 |
| 2016/0195922 | A1* | 7/2016 | Lo ......................... G06F 3/0362 345/156 |
| 2017/0361225 | A1 | 12/2017 | Goslin et al. |
| 2019/0251937 | A1* | 8/2019 | Mulhern .............. G10H 1/0066 |
| 2020/0066390 | A1* | 2/2020 | Svendrys ............. G06F 3/0346 |
| 2020/0254332 | A1* | 8/2020 | Macri ................. A63B 71/0622 |
| 2020/0323657 | A1* | 10/2020 | Pande .................. A61H 1/0285 |
| 2020/0338425 | A1* | 10/2020 | Murdock .............. A63F 13/573 |
| 2020/0357249 | A1* | 11/2020 | Al-Husseiny ........... G06F 3/016 |
| 2021/0011542 | A1* | 1/2021 | Sumner ................. G06T 19/006 |
| 2021/0064134 | A1* | 3/2021 | Rofougaran ............ G06F 3/011 |

OTHER PUBLICATIONS

Buscher, G.H. et al. (2015). Flexible and stretchable fabric-based tactile sensor. Robotics and Autonomous Systems, 63, 244-252.

Burns, R. B. et al. (2020). Getting in touch with children with autism: Specialist guidelines for a touch-perceiving robot. Paladyn, Journal of Behavioral Robotics, 12(1), 115-135.

Culjak, Ivana, et al. (2020). Wireless body sensor communication systems based on UWB and IBC technologies: State-of-the-art and open challenges. sensors 20.12, 3587.

Robins, Ben et al. (2014). Tactile interactions with a humanoid robot: novel play scenario implementations with children with autism. International journal of social robotics, 6, 397-415.

Round Force-Sensitive Resistor (FSR)—Interlink 402. 5 pages.

K. R. Ginsburg, "The importance of play in promoting healthy child development and maintaining strong parent-child nonds," Pediatrics, vol. 119, No. 1, pp. 182-191, 2007.

S. L. Nijhof et al., "Healthy play, better coping: The importance of play for the development of children in health and disease," Neurosci. Biobehav. Rev., vol. 95, pp. 421-429, 2018.

M. Yogman, A. Garner, J. Hutchinson, K. Hirsh-Pasek, and R. M. Golinkoff, "The Power of Play: A Pediatric Role in Enhancing Development in Young Children," Pediatrics, 2018. e20182058.

Childstats.gov, "Child population, Table 1," 2018. [Online]. Available: https://www.childstats.gov/americaschildren/tables.asp. [Accessed: Nov. 16, 2018].

L. Kraus, E. Lauer, R. Coleman, and A. Houtenville, "2017 Disability Statistics Annual Report," 2018.

A. Goudie, S. Havercamp, L. Ronbom, and B. Jamieson, "Caring for children with disabilities in Ohio: The impact on families," 2010.

E. L. Ardiel and C. H. Rankin, "The importance of touch in development," Paediatrics and Child Health. 2010. 153-156.

T. Field, "Touch for socioemotional and physical well-being: A review," Developmental Review. 2010. 367-383.

M. Gori, "Multisensory integration and calibration in children and adults with and without sensory and motor disabilities," Multisens. Res., 2015.71-99.

L. Zhang, Z. Warren, A. Swanson, A. Weitlauf, and N. Sarkar, "Understanding Performance and Verbal-Communication of Children with ASD in a Collaborative Virtual Environment," J. Autism Dev. Disord., 2018. 2779-2789.

H. Zhao, A. R. Swanson, A. S. Weitlauf, Z. E. Warren, and N. Sarkar, "Hand-in- Hand: A Communication-Enhancement Collaborative Virtual Reality System for Promoting Social Interaction in Children with Autism Spectrum Disorders," IEEE Trans. Human-Machine Syst., 2018. 136-148.

E. D. Blume et al., "Parental perspectives on suffering and quality of life at end-of- life in children with advanced heart disease: An exploratory study," Pediatric Critical Care Medicine, vol. 15, No. 4. 2014. 336-342.

P. M. Sadler, G. Sonnert, Z. Hazari, and R. Tai, "Stability and volatility of STEM career interest in high school: A gender study," Sci. Educ., 2012. 411-427.

T. Buser, M. Niederle, and H. Oosterbeek, "Gender, competitiveness, and career choices," Q. J. Econ., 2014. 1409-1447.

The AbleGamersFoundation, "Includification," Includification: A practical guide to game accessibility, 2012. [Online]. Available: https://www.includification.com/AbleGamers_Includification.pdf. [Accessed: Nov. 21, 2018].

\* cited by examiner

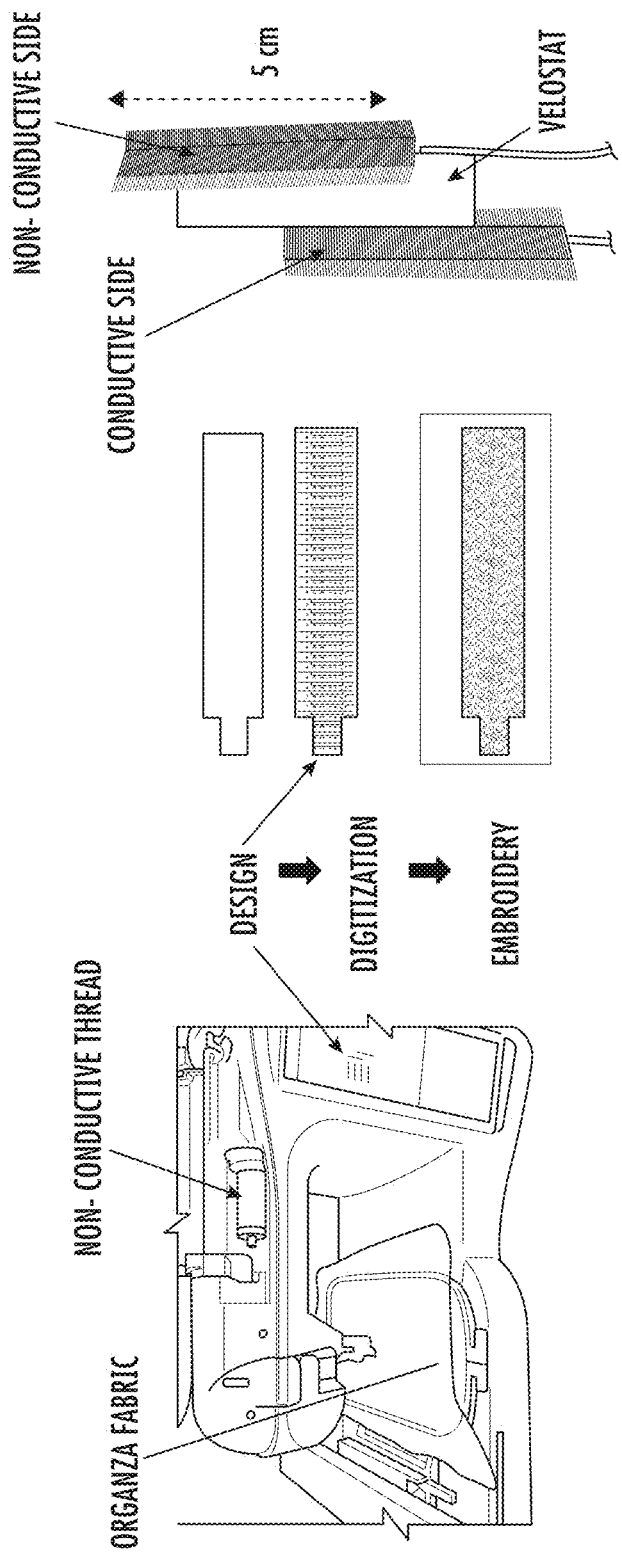

Comparison of reported solution as compared to previously reported embroidered FSR

| Ref. | Application | Dynamic Range Explored | Sensitivity (change in resistance) from 0 to 5N | E-thread Resistivity ($\Omega$/m) |
|---|---|---|---|---|
| This work | Collaborative gaming | <5N | >8000 | 1.9 |
| [33] | Driving gloves | 0-20 N | 80 | 127 |
| [34] | Object Recognition | 0-30 N | 1000 | 200 ($\Omega$/m$^2$) |
| [35] | Respiration/Posture Monitoring | 0.56-56.7 N | 40 | -- |
| [36] | Mobility Detection | 0-5 N | 1800 | 120 |

FIG. 17A

Performance of off-the-shelf FSR for 1-finger touch when placed on different locations.

| | | | Value in ESP32 GPIO/Touch Pin Register | | | | |
|---|---|---|---|---|---|---|---|
| | | | Direct Skin | Fabric 1 | Fabric 2 | Fabric 3 | Fabric 4 |
| forearm | no touch | (a) | 15-18 | 23-24 | 26-27 | 26-27 | 24-26 |
| | 1-finger touch | (b) | 0-2 | 1-3 | 1-2 | 1-2 | 1-2 |
| palmar side of hand | no touch | (c) | 13-16 | 24-25 | 26-27 | 28-29 | 27-28 |
| | 1-finger touch | (d) | 0-1 | 1-2 | 0-2 | 1-3 | 1-2 |
| dorsal side of hand | no touch | (e) | 24-25 | 24-26 | 25-27 | 26-27 | 26-28 |
| | 1-finger touch | (f) | 0-2 | 0-2 | 0-1 | 1-3 | 1-2 |
| Max. change in register value | | | 22-25 (e)-(f) | 22-26 (e)-(f) | 24-27 (c)-(d) | 26-28 (c)-(d) | 25-27 (c)-(d) |

FIG. 18

Performance of off-the-shelf FSR for different types of touches when placed on the forearm.

| | | Direct Skin | Fabric 1 | Fabric 2 | Fabric 3 | Fabric 4 |
|---|---|---|---|---|---|---|
| no touch | (a) | 15-18 | 23-24 | 26-27 | 26-27 | 24-26 |
| 1-finger touch | (b) | 0-2 | 1-3 | 1-2 | 1-2 | 1-2 |
| 2-finger touch | (c) | 0-1 | 1-2 | 1-2 | 0-1 | 1-2 |
| palmar side of hand touch | (d) | 0-1 | 1-2 | 1-3 | 0-2 | 1-2 |
| dorsal side of hand touch | (e) | 0-2 | 1-3 | 1-3 | 1-2 | 1-3 |
| Max. change in register value | (c)-(a) | 14-18 | 21-23 | 24-26 | 25-27 | 22-25 |

FIG. 19

Performance comparison of the three FSRs

| | | Value in ESP32 GPIO/Touch Pin Register | | |
|---|---|---|---|---|
| | | Off-the-shelf FSR | Woven Fabric FSR | Embroidered FSR |
| no touch | (a) | 26-27 | 19-21 | 57-58 |
| 1-finger touch | (b) | 1-2 | 0-2 | 0-1 |
| 2-finger touch | (c) | 0-1 | 0-1 | 0-1 |
| palmar side of hand touch | (d) | 0-2 | 0-1 | 0-1 |
| dorsal side of hand touch | (e) | 1-2 | 0-1 | 0-1 |
| Max. change in register value | (a)-(c) | 25-27 | 18-21 | 56-58 |

FIG. 20

Error calculation for different touch patterns

| | Trials | Off-the-shelf FSR | | Woven Fabric FSR | | Embroidered FSR | |
|---|---|---|---|---|---|---|---|
| | | No. of Touches Registered | % Error | No. of Touches Registered | % Error | No. of Touches Registered | % Error |
| 1-finger precision touch | 50 | 48 | 4% | 47 | 6% | 49 | 2% |
| 2-finger precision touch | 50 | 49 | 2% | 46 | 8% | 49 | 2% |
| 1-finger partial touch | 50 | 45 | 10% | 46 | 8% | 47 | 6% |
| 2-finger partial touch | 50 | 43 | 14% | 44 | 12% | 48 | 4% |
| random palm touch | 50 | 49 | 2% | 47 | 6% | 49 | 2% |
| center of palm touch | 50 | 26 | 48% | 36 | 28% | 42 | 16% |

FIG. 21

Effect of e-thread density in the performance of embroidered FSRs.

| | Value in ESP32 GPIO/Touch Pin Register | | |
|---|---|---|---|
| | 1 e-thread/mm | 4 e-threads/mm | 7 e-threads/mm |
| no touch | 43-44 | 49-50 | 39-41 |
| 1-finger touch | 19-21 | 0-1 | 0-1 |
| Max. change in register value | 22-25 | 48-50 | 38-41 |

FIG. 22

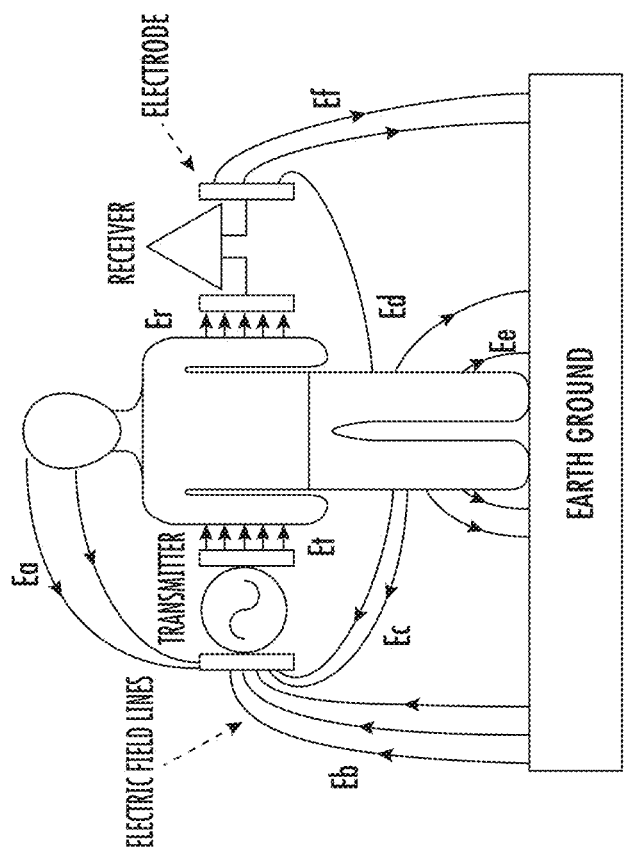
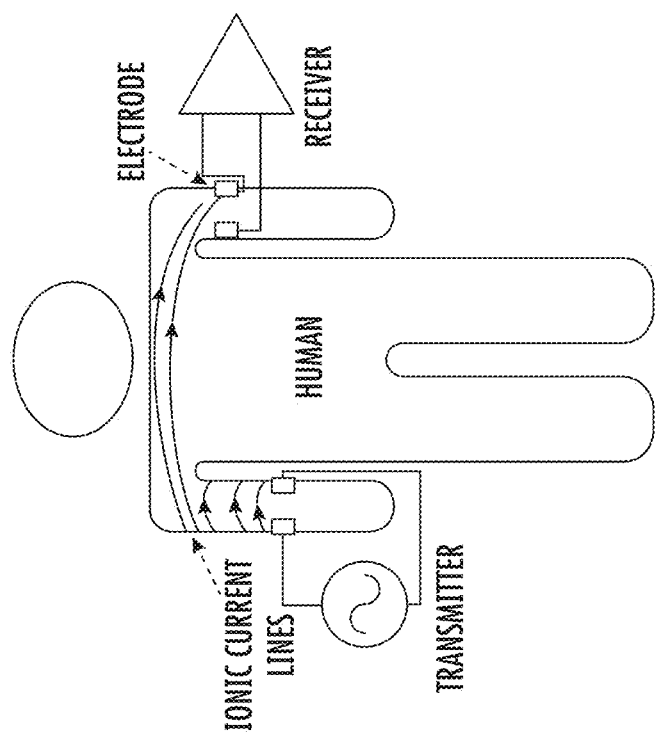
FIG. 23B
FIG. 23A

| Description | $|S_{21}|$ during Touch (dB) |
|---|---|
| Standard | -39.384 |
| Copper bracelet on one user | -39.436 |
| 5 gold bracelets on arm of each user | -38.973 |
| Smaller electrodes (1 x 1 cm) | -45.349 |
| Larger electrodes (4 x 4 cm) | -38.837 |
| Rubber glove on one user | -39.059 |
| 4 titanium screws in wrist of one user | -39.208 |

FIG. 26

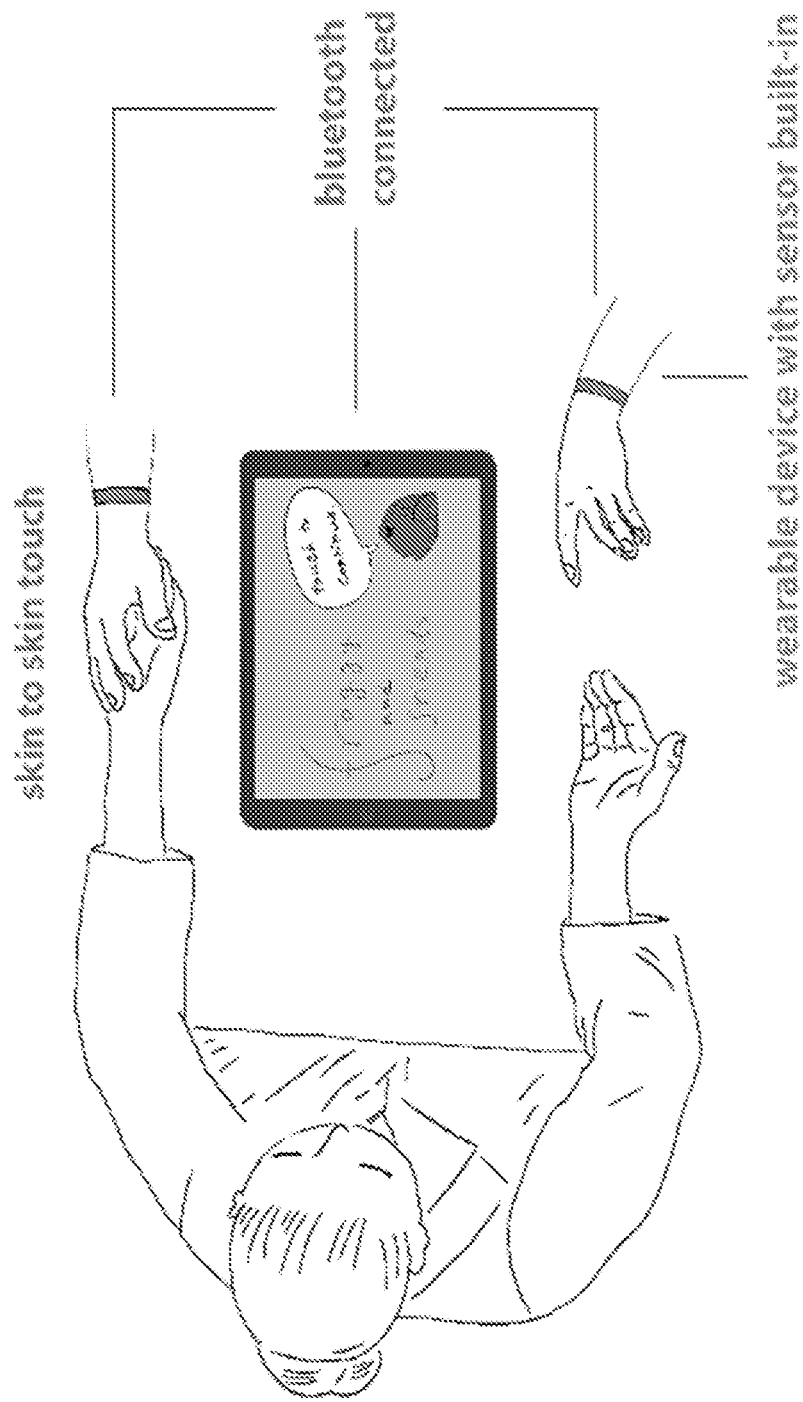

SYSTEMS FOR COLLABORATIVE INTERACTION USING WEARABLE TECHNOLOGY

CROSS-REFERENCE TO RELATED APPLICATIONS

This application is a national stage application filed under 35 U.S.C. § 371 of PCT/US2022/015077, filed Feb. 3, 2022, which claims the benefit of U.S. provisional patent application No. 63/145,082, filed on Feb. 3, 2021, and titled "SYSTEMS FOR COLLABORATIVE INTERACTION USING WEARABLE TECHNOLOGY," the disclosure of which is expressly incorporated herein by reference in its entirety.

BACKGROUND

The American Academy of Pediatrics states that "play is essential to development because it contributes to the cognitive, physical, social, and emotional well-being of children and youth." [1, p. 182] Play, leisure activities, and living a full life have long been recognized by the United Nations High Commission for Human Rights as a right of every child including those with disabilities.[2] Play is the "work" of childhood, and is vital to growth in cognitive, physical, and social arenas as well as overall brain development.[3], [4] Today, over 5.5 million children in the United States have a physical or cognitive disability that results in at least some difficulty with activities including play.[3], [5], [6] These same children often lose out on the benefits of playing with their parents and caregivers, and in general are less able to express themselves and make meaningful connections with them.[4] For example, researchers observe that severely disabled children can have limited playful interaction with their parents. Current technologies, including gaming platforms, lack the ability to create meaningful connections between these family members where it is desperately needed.

Families who have children with disabilities experience more challenges interacting with their children than families who have children without disabilities. This increased level of burden results in higher rates of emotional stress and hardship for those families.[7] For example, touch is an intrinsic part of human development. Lack of touch can result in physical, cognitive, and emotional developmental delays as shown in severely premature infants as well as children raised in institutional environments.[8], [9] Studies with children who have sensory deficits and/or physical or cognitive developmental delays have shown that lack of touch and other deliberate sensory stimulations such as visual, auditory, and/or touch, result in a developmental delay in all areas, not just the original deficit.[10]

Therefore, what is needed are systems enabling collaborative interaction using wearable technology. Motivated by the idea of making deeper connections between disabled children and their parents, the systems described below are designed around two key concepts—human touch and collaborative play.

SUMMARY

Described herein are systems for collaborative interaction using wearable technology. An example system includes a wearable sensor configured to sense a collaborative interaction event, a microcontroller including a wireless transceiver, where the microcontroller is in operable communication with the wearable sensor, and where the microcontroller is configured to receive a sensor signal from the wearable sensor; and transmit, using the wireless transceiver, the sensor signal. The system also includes a computing device in operable communication with the microcontroller. The computing device includes a processor and a memory, the memory having computer-executable instructions stored thereon that, when executed by the processor, cause the processor to: receive the sensor signal from the microcontroller; analyze the sensor signal to detect the collaborative interaction event; and generate a control command in response to detecting the collaborative interaction event.

Alternatively or additionally, the system further includes a plurality of wearable sensors.

Alternatively or additionally, a first wearable sensor of the plurality of wearable sensors is configured to be worn by a first user and a second wearable sensor of the plurality of wearable sensors is configured to be worn by a second user, and at least one of the first wearable sensor or the second wearable sensor senses the collaborative interaction event.

Alternatively or additionally, the memory has further computer-executable instructions stored thereon that, when executed by the processor, cause the processor to generate a different control command in response to detecting the collaborative interaction event at each of the plurality of wearable sensors. Optionally, the memory has further computer-executable instructions stored thereon that, when executed by the processor, cause the processor to generate a different control command in response to detecting the collaborative interaction event at a distinct combination of the plurality of wearable sensors.

In some implementations, the wearable sensor is a pressure sensor. Alternatively or additionally, the wearable sensor is a proximity sensor. In some implementations, the wearable sensor is configured to sense skin-to-skin contact between two different users.

In some implementations, the wearable sensor is a force sensitive resistor. Optionally, the force sensitive resistor includes a force-sensitive material and an embroidered material. In some implementations, the embroidered material comprises conductive thread.

In some implementations, the wearable sensor is an impedance sensor. Alternatively or additionally, the wearable sensor is an ultrasound sensor.

In some implementations, the wearable sensor is a human body communication sensor. Optionally, the system comprises at least three wearable sensors and the at least three wearable sensors are human body communications sensors. In some implementations, the microcontroller is configured to simultaneously receive sensor signals from each of the at least three human body communication sensors.

Alternatively or additionally, the memory has further computer-executable instructions stored thereon that, when executed by the processor, cause the processor to update the object's state within the gaming environment. Optionally, the computing device further includes a user interface, and the memory has further computer-executable instructions stored thereon that, when executed by the processor, cause the processor to graphically display the display data on the user interface.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

FIG. 5A illustrates the detection of a wave propagating along the surface of flesh, and FIG. 5B illustrates the detection of a wave transmitted vertically through the flesh.

FIG. 13A illustrates the location of sensors on one of the two players. FIG. 13B illustrates a block diagram of a proposed wearable sensor capable of communicating wirelessly with a mobile device.

FIG. 14A illustrates an armband prototype with embedded FSRs and FIG. 14B illustrates a wearable sensor showing the casing for the ESP32 and the wristband with the FSR.

FIG. 15A illustrates an off-the-shelf FSR, FIG. 15B illustrates a thru-mode FSR with woven conductive fabric according to an implementation of the present disclosure, and FIG. 15C illustrates a thru-mode FSR with embroidered e-threads according to an implementation of the present disclosure.

FIGS. 16A-16D illustrate a process for embroidering a thru-mode embroidered FSR (e.g. the thru-mode FSR shown in FIGS. 15B and 15C), according to one implementation of the present disclosure. FIG. 16A illustrates a Brother 4500D embroidery machine including Organza Fabric and Non-conductive thread; FIG. 16B illustrates the design, digitization, and final embroidered product, according to one implementation of an FSR; FIG. 16C illustrates an FSR according to one implementation of the present disclosure; FIG. 16D illustrates fabrics that can be used in implementations of the present disclosure.

FIG. 17A illustrates a table comparing the properties of the FSRs disclosed herein to other FSRs.

FIG. 18 illustrates a table showing the performance of an existing off-the-shelf FSR (e.g., the FSR shown in FIG. 15A) to application of a 1-finger touch.

FIG. 19 illustrates a table showing the performance of an existing FSR (e.g., the FSR shown in FIG. 15A) when different types of touches are applied to a forearm.

FIG. 20 illustrates a table comparing implementations of FSRs disclosed herein (e.g., woven fabric FSR shown in FIG. 15B, embroidered fabric FSR shown in FIG. 15C) to existing FSRs (e.g., off-the-shelf FSR shown in FIG. 15A) when different touches are applied.

FIG. 21 illustrates a table comparing error calculations for different touch patterns for existing FSRs (e.g., off-the-shelf FSR shown in FIG. 15A) and implementations of the FSRs disclosed herein (e.g., woven fabric FSR shown in FIG. 15B, embroidered fabric FSR shown in FIG. 15C).

FIG. 22 illustrates a table comparing the density of e-threads in embroidered FSRs to the performance of those FSRs.

FIGS. 23A-23B illustrate the operation of human body communication (HBC) techniques, where FIG. 23A illustrates galvanic HBC coupling, and FIG. 23B illustrates capacitive HBC coupling.

FIG. 26 illustrates experimental results showing the effect of different experimental parameters on the sensitivity of the HBCs.

FIG. 28A illustrates a view from one end of the sensor, FIG. 28B illustrates a side view of the sensor, and FIG. 28C illustrates the bottom of the sensor.

FIGS. 29A-29C illustrates the use of an implementation of the present disclosure with two users controlling a game. FIG. 29A illustrates skin to skin touch, according to an implementation of the present disclosure. FIG. 29B illustrates sensor touch, according to an implementation of the present disclosure. FIG. 29C illustrates two users engaging in collaborative touch to control a virtual environment, in which touching the left sensor, touching the right sensor, and touching both sensors result in control inputs to the virtual environment.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. While implementations will be described for controlling a virtual environment (e.g. controlling a game), it will become evident to those skilled in the art that the implementations are not limited thereto, but are applicable to performing any kind of user input or control. Throughout the present disclosure, the term "collaborative interaction event" may be used to refer to contact between users (e.g., skin-to-skin), contact with sensors worn by users, patterns of contact between users and/or sensors, near contact between users (proximity sensing), near contact with sensors worn by users (proximity sensing), or patterns of near contact between users and/or sensors.

Figure 1:
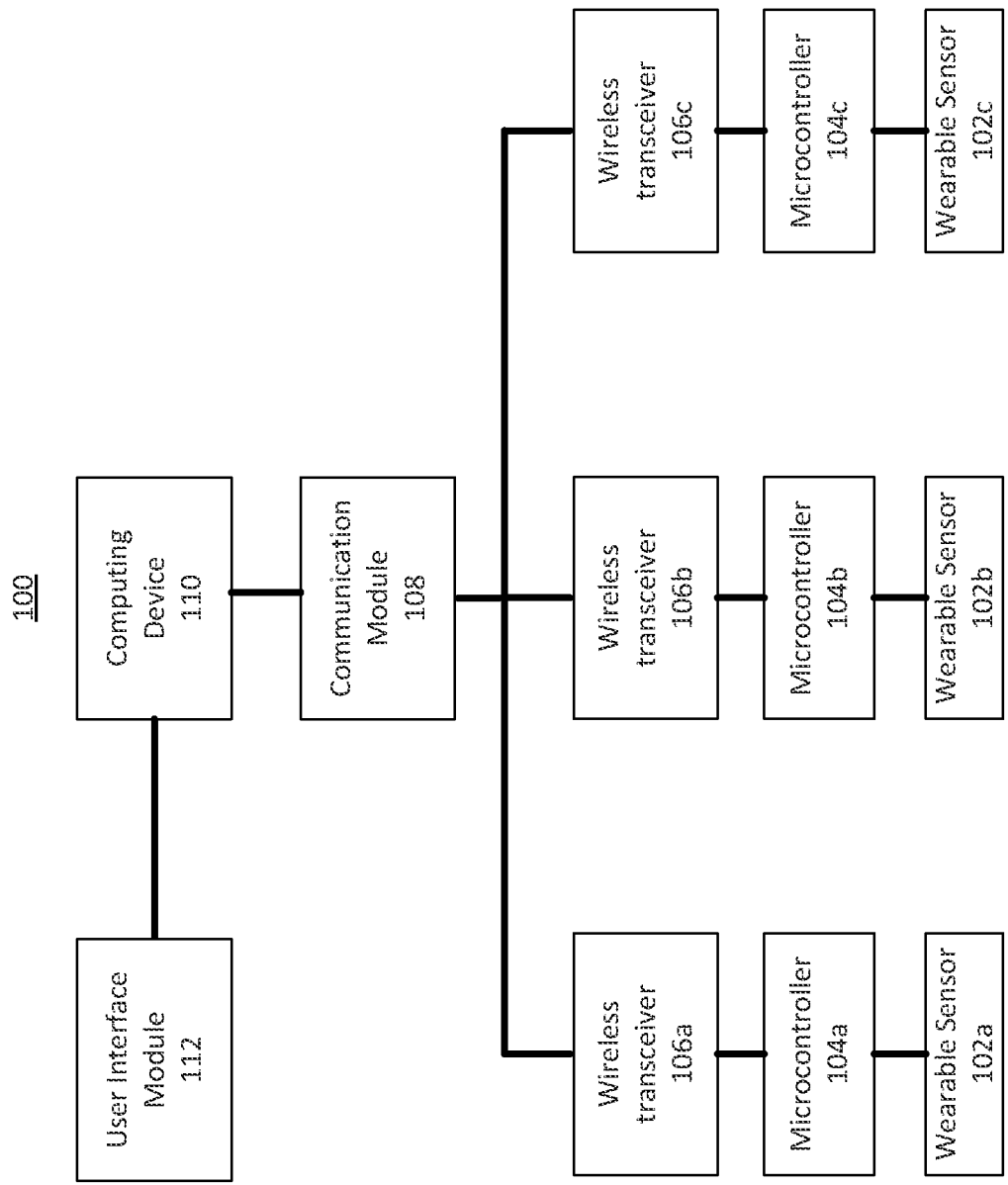
FIG. 1 is an architecture diagram, according to one implementation described herein.

With reference to FIG. 1, a system block diagram representing an implementation of the present disclosure is illustrated. It should be understood that the system shown in FIG. 1 is provided only as an example. This disclosure contemplates that a system for collaborative interaction using wearable technology can include more or less of the components shown in FIG. 1. The system can include one or more wearable sensors 102. In FIG. 1, wearable sensors 102a, 102b, 102c (referred to herein individually or collectively as wearable sensor 102 or wearable sensors 102) are shown. It should be understood that the number of wearable sensors 102 shown in FIG. 1 is only provided as an example. This disclosure contemplates providing more or less than three wearable sensors. Additionally, this disclosure contemplates that the number of wearable sensors 102 worn by each user (e.g., 0, 1, 2, 3, etc.) may vary depending on the sensing technology and/or number of users. The wearable sensors can be configured to sense a collaborative interaction event. For example, in some implementations, touch, for example the first user touching a second user, or the second user touching the first user. In some implementations, the wearable sensors 102 sense skin-to-skin contact between the first and second user. In other implementations, the wearable sensors 102 sense user contact with one or more of the sensors (e.g., first user contacting sensor worn by second user and/or second user contacting sensor worn by first user). A wearable sensor is "worn by" a user when it is positioned relative to the user to that it can receive information related to that user. A "wearable sensor" 102 can be any sensor that is positioned on or in a user's body, clothing, or apparel. Non limiting examples of wearable sensors include sensors positioned in a watch band, a sensor incorporated into a bracelet, ring or other jewelry, sensors positioned on the skin of a user, and/or sensors woven into a user's clothing. In these examples, a wearable sensor is "worn by" a user when the sensor is either directly attached on or near the user, or when the article of clothing or apparel is attached to the user (e.g. when a bracelet containing a wearable sensor is wrapped around a user's wrist, or a pad containing a wearable sensor is adhered to a user's skin).

Figure 2:
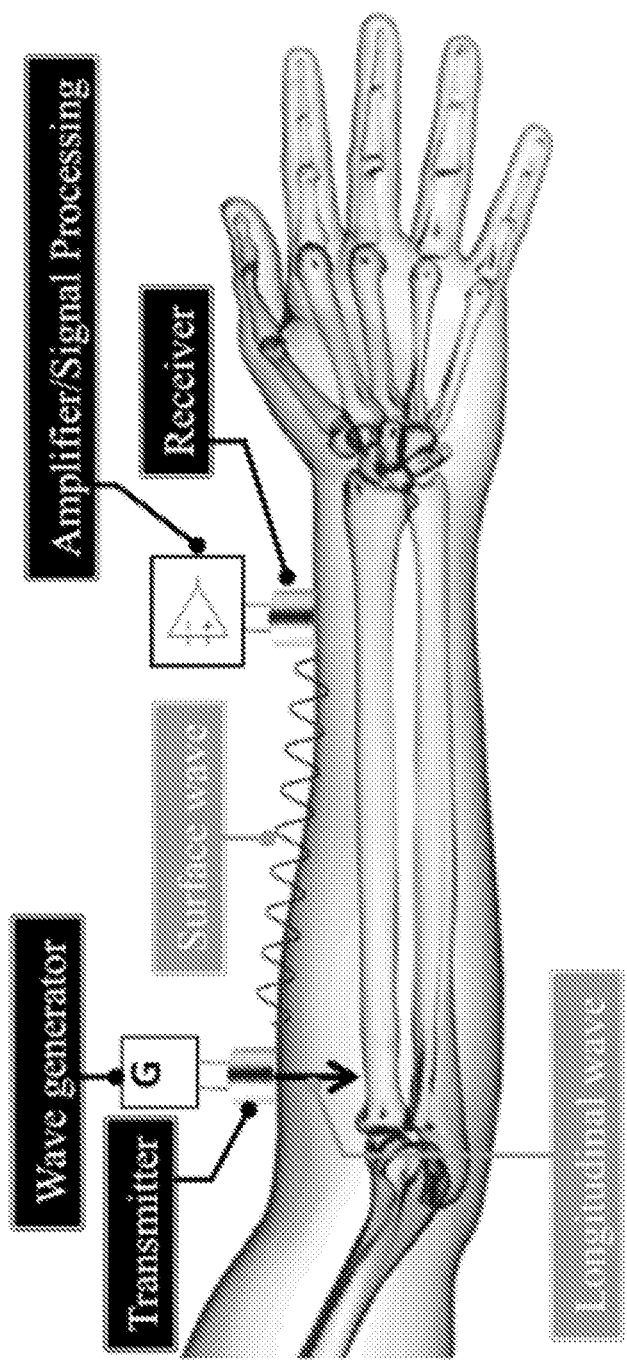
FIG. 2 illustrates an ultrasound system that uses ultrasound signal propagation across the skin to sense contact, which can be used in some implementations of the present disclosure.
Figure 3:
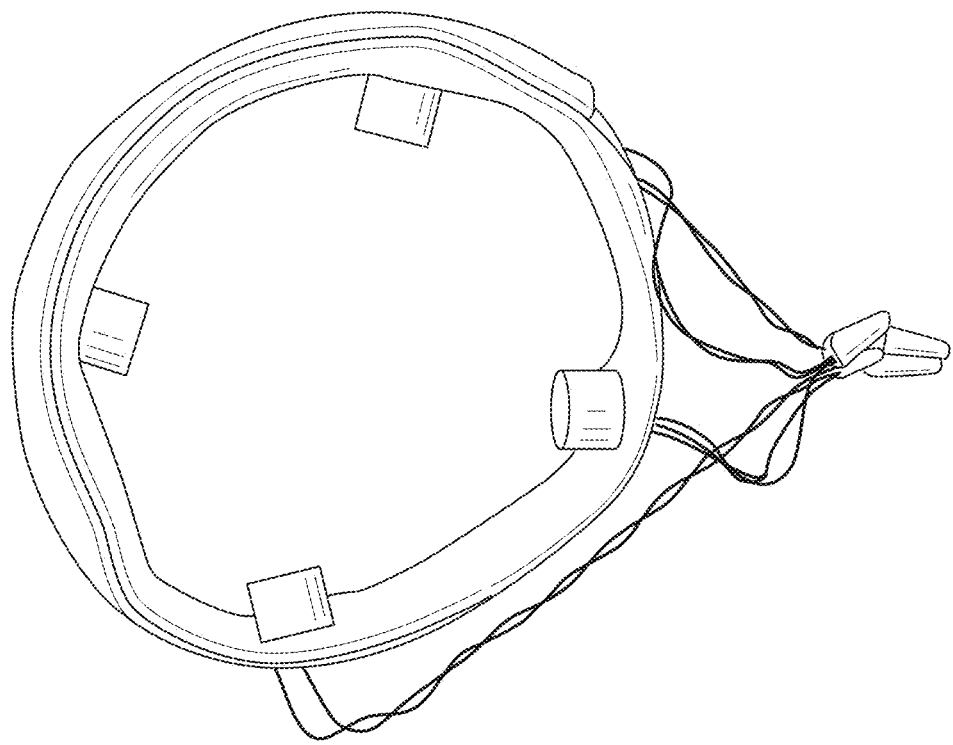
FIG. 3 illustrates a finger mounted receiver and armband mounted sensor that can be used as part of an ultrasound-based contact sensing system, as part of some implementations described herein.
Figure 4:
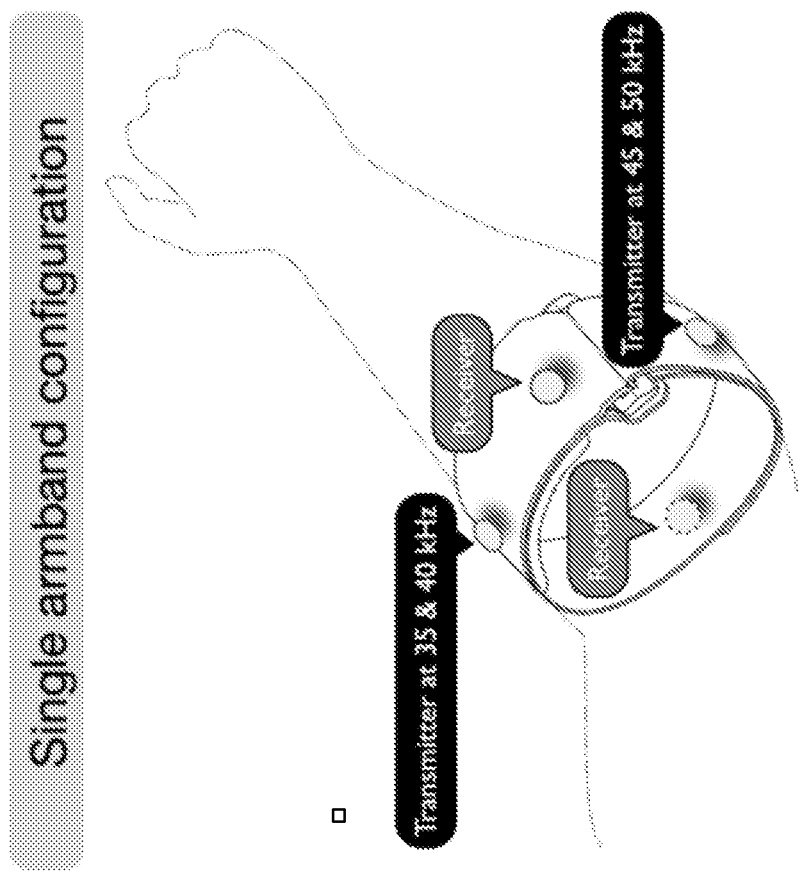
FIG. 4 illustrates a configuration of an ultrasound system that can be used in some implementations of the present disclosure.

Many different types of wearable sensor 102 are contemplated by the present disclosure. In some implementations, one or more of the wearable sensors 102 are pressure sensors or proximity sensors. It should be understood that pressure and proximity sensors are only examples. This disclosure contemplates that the wearable sensors can include, but are not limited to, sensors that use impedance (e.g. electrical impedance tomography), ultrasound sensors, magnetic sensors, electric field sensors, light sensor, or any other suitable sensors for detecting contact or proximity. For example, in some implementations, one or more of the wearable sensors 102 are optionally human body communication (HBC) sensors. HBC sensors are also referred to as "intra-body communication sensors." In should be understood that HBC sensors can operate by capacitive coupling, galvanic coupling, or a combination of capacitive and galvanic coupling. Example HBC sensors are shown, for example, in FIGS. 24, 25, 27, and 28A-28C. In other implementations, one or more of the wearable sensors 120 are optionally force sensing resistor (FSR) sensors. Example FSR sensors are shown, for example, in FIGS. 15A-15C. Additionally, FIG. 2 shows an illustration of an ultrasound system for detecting touch, and FIG. 3 illustrates a finger-mounted receiver and armband mounted sensor that can be used as wearable sensors 102. FIG. 4 illustrates another combination of ultrasound transmitters and receivers that can be used as a wearable sensor 102. An ultrasound transmitter can transmit ultrasound through the skin or other tissue of a first user (e.g. through the user's arm), and a receiver configured to detect ultrasound can be positioned on the second user (e.g. on the second user's finger or hand). Therefore when the receiver on the second user is brought into proximity or contact with the skin/tissue of the first user that the ultrasound signal is transmitted through, the receiver can detect the ultrasound signal.

Figure 5A:
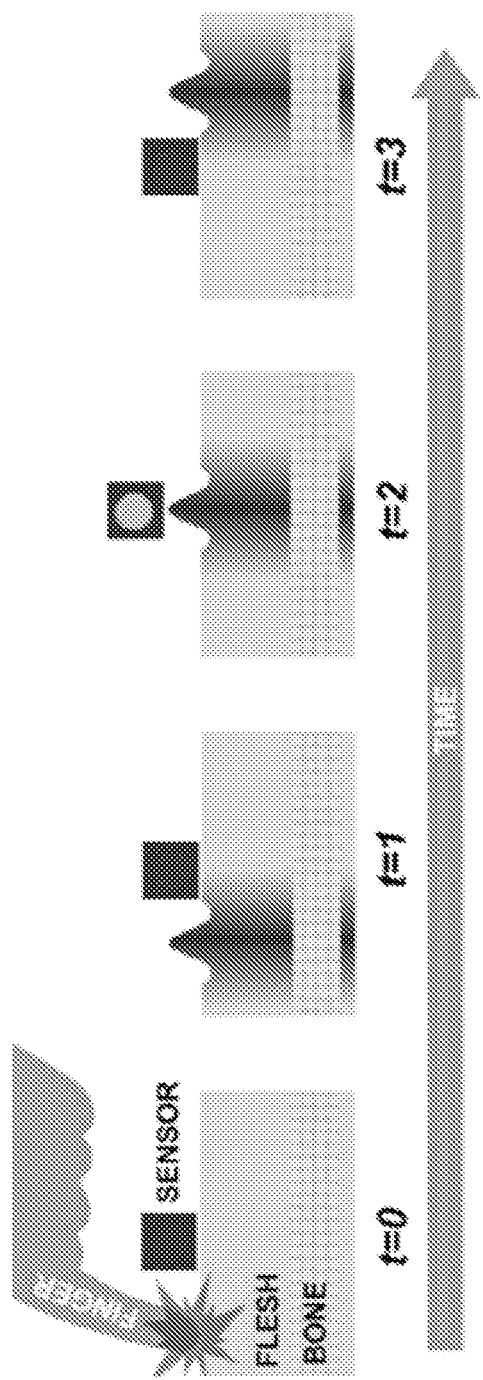
FIGS. 5A-5B illustrates the operation of a sensor that can detect touch based on the movement of flesh.
Figure 5B:
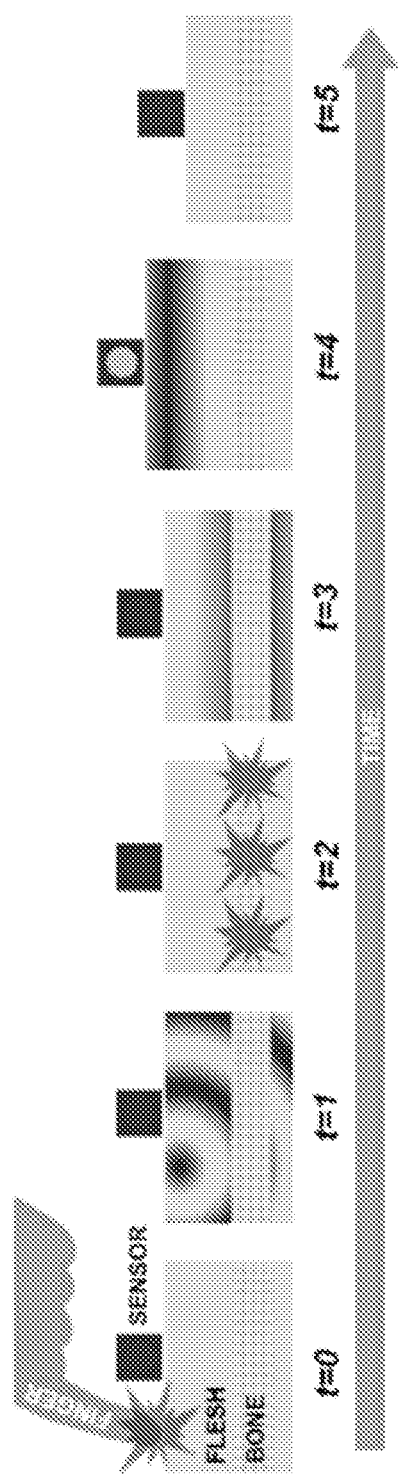
Figure 6:
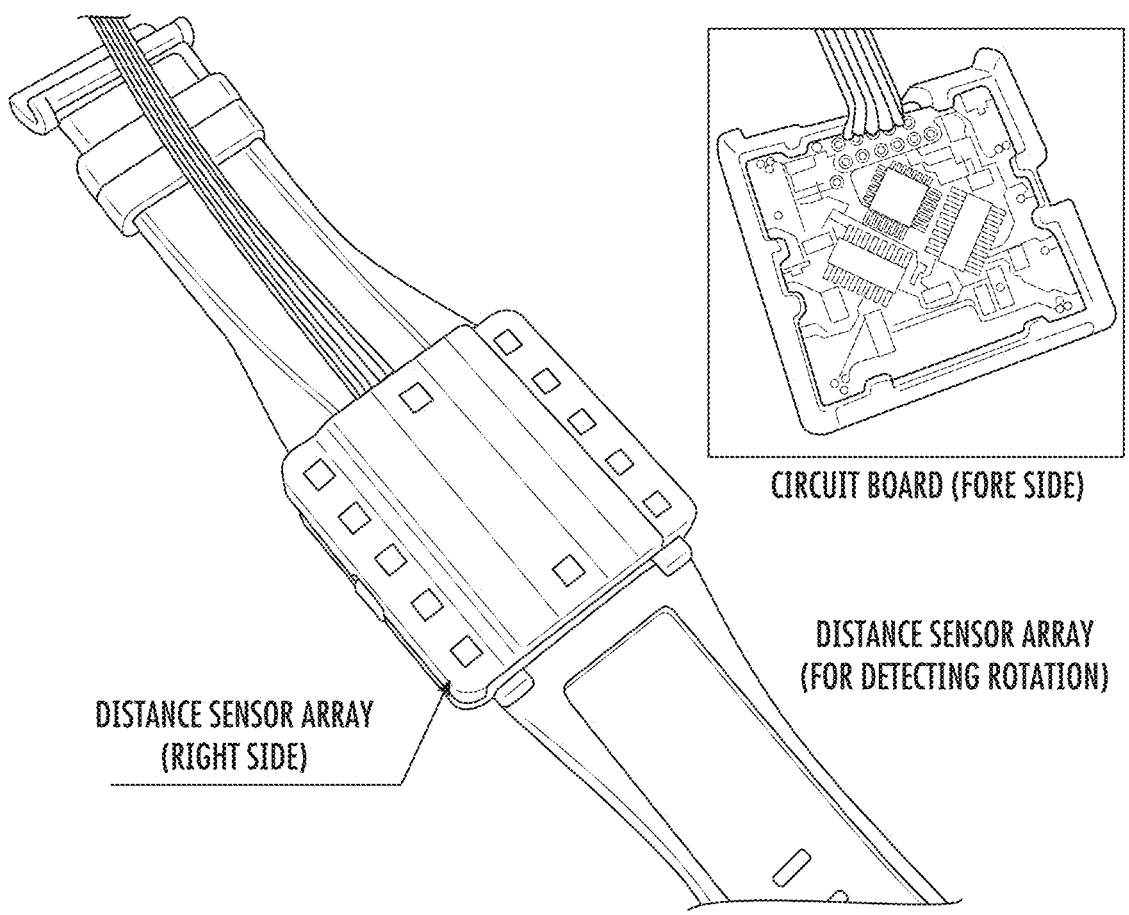
FIG. 6 illustrates a watchband including an array of infrared LEDs that can be used to detect compression of the skin around the watchband.
Figure 7:
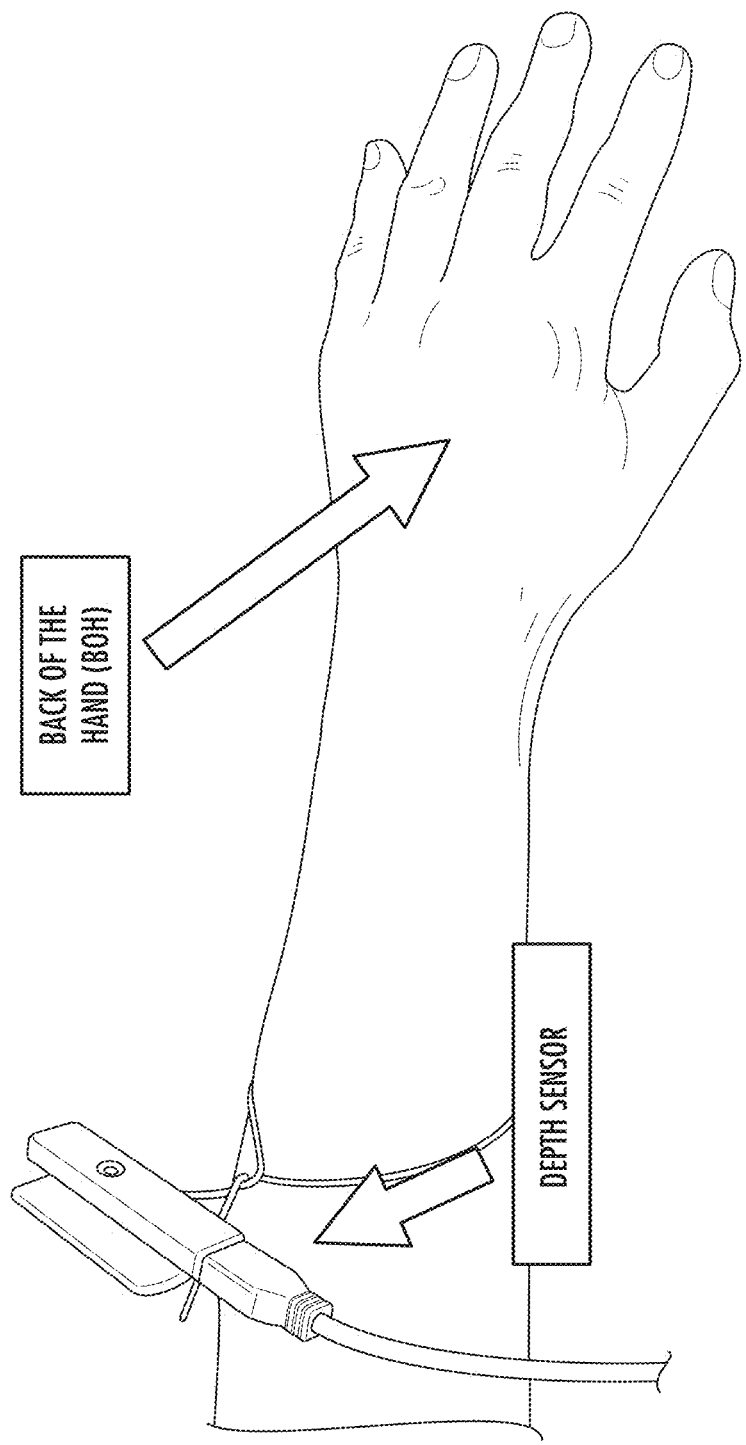
FIG. 7 illustrates a sensor for detecting contact using sensor to track a finger and "see" the contact between the finger and the skin surface.
Figure 8:
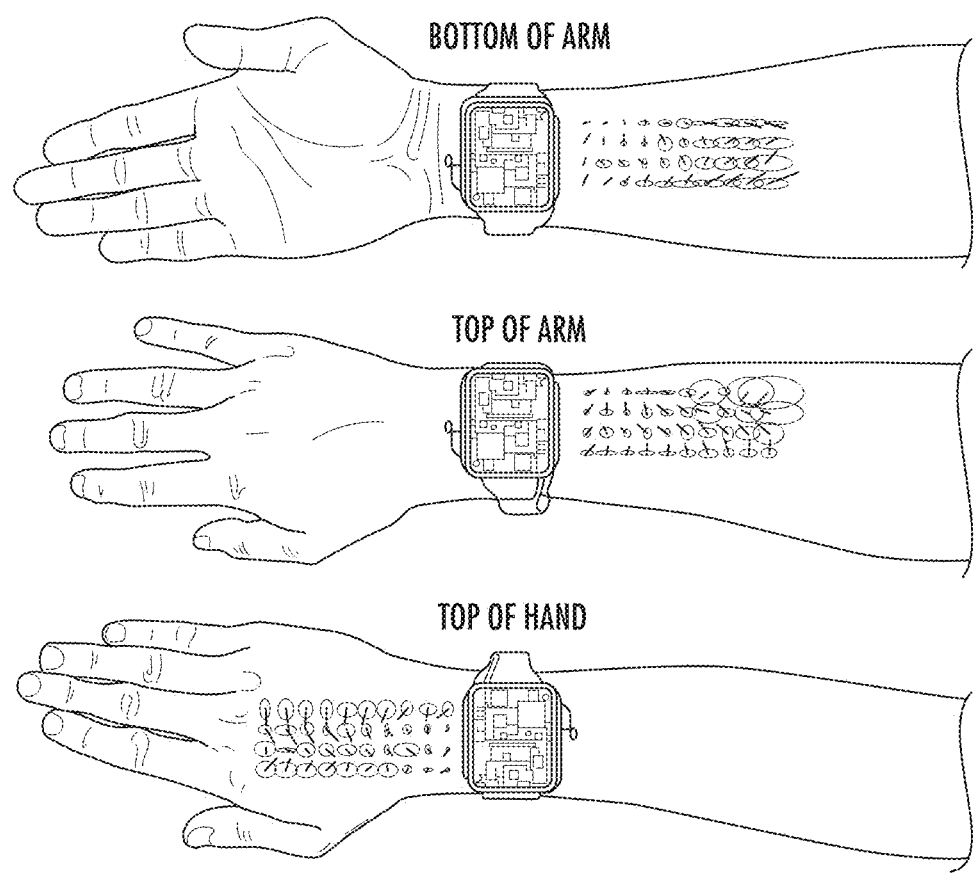
FIG. 8 illustrates the field of view of an exemplary depth sensor that can be used in some implementations described herein as part of a wearable sensor, similar to that illustrated in FIG. 7.
Figure 9:
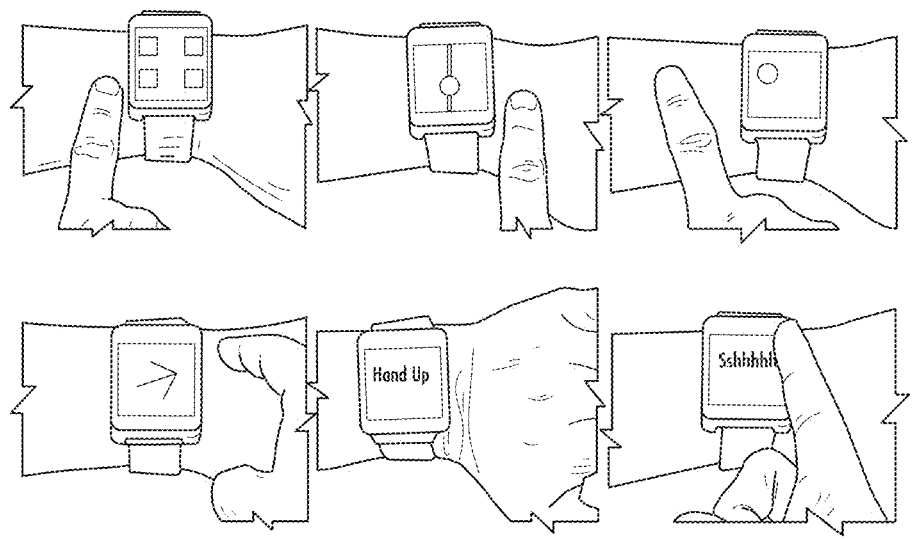
FIG. 9 illustrates an example of "on skin" buttons as part of a watchband that can be used as part of implementations of the present disclosure.
Figure 10:
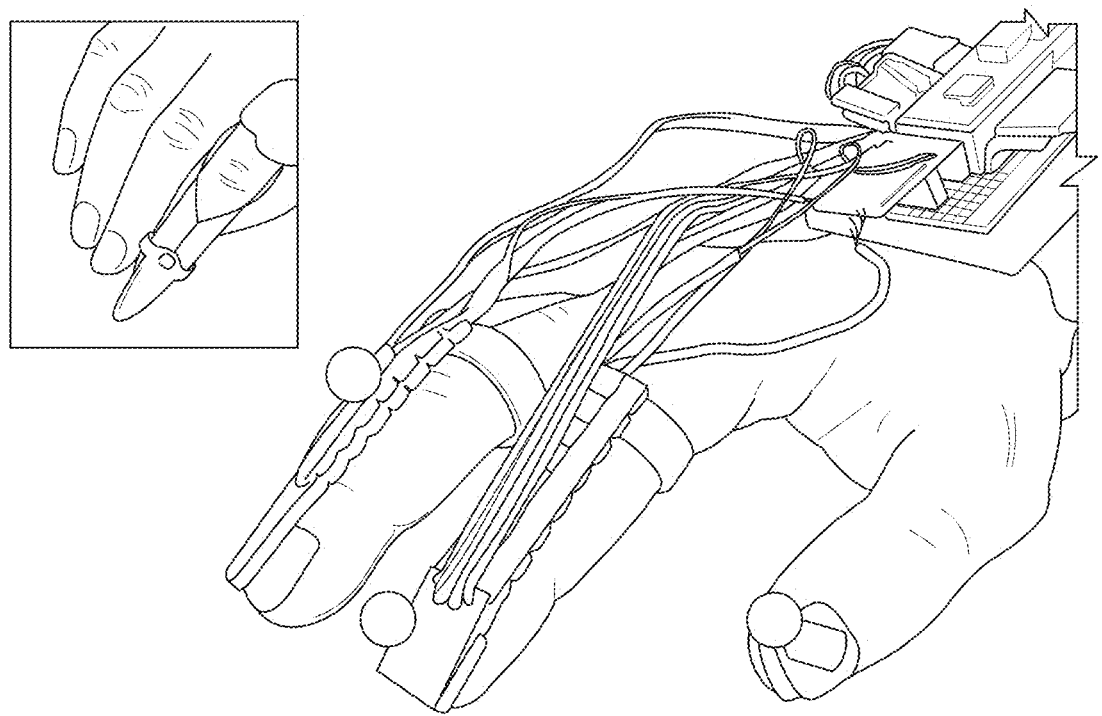
FIG. 10 illustrates a configuration of wearable sensor uses a magnet and magnetic field sensor(s) that can be used as part of implementations of the present disclosure.

It is also contemplated that any sensor configured to sense contact or proximity can be used according to some implementations described herein. FIGS. 5A and 5B illustrate how sensing can be performed based on detecting finger inputs on skin itself. FIG. 5A illustrates transverse wave propagation. As shown in FIG. 5A, a finger impacting skin can displace the skin and create a transverse wave. A sensor located on the skin can be configured to detect this wave, and therefore that a touch (the finger impacting the skin) occurred. As shown in FIG. 5B, a finger impacting skin can displace the skin and create a wave transmitted vertically through the flesh. A sensor located on the skin can be configured to detect this wave, and therefore that a touch (the finger impacting the skin) occurred. FIG. 6 illustrates a watchband including an array of infrared LEDs that can be used to detect compression of the skin around the watchband. The infrared LEDs can be configured to sense the distance that the skin is from the watchband. When the skin around the watchband is touched (and therefore compressed) the LEDs can detect the increased distance between the watchband and the skin, and therefore detect that the skin near the watchband has been touched. FIG. 7 illustrates another sensor for detecting contact using a depth sensor to track a finger and "see" the contact between the finger and the skin surface. The depth sensor can be used to create a "depth map" which can then be analyzed to determine whether a finger or hand is in the scene, and whether that finger or hand is contacting the user on which the depth sensor is placed. FIG. 8 illustrates the field of view of an exemplary depth sensor incorporated into a wristband that can be used in some implementations described herein as part of a wearable sensor 102. The sensor shown in FIG. 8 can function similar to that of FIG. 7. By sensing depth along the direction of the user's arm, the sensor can determine both that a touch occurred, and the location of the touch, as shown in FIG. 8. FIG. 9 illustrates another example of "on skin" buttons as part of a watchband that can be used as part of implementations of the present disclosure. The sensor shown in FIG. 9 detects electric field using electrodes located on the skin of the first user. The change in electric field caused by a nearby or touching finger can be used to detect proximity or contact. FIG. 10 shows another configuration of wearable sensor that can be used as part of implementations of the present disclosure. A magnet can be positioned on one user, and a magnetic field detector can be placed on the other user. When the magnet is brought into proximity with the magnetic field detector, a touch can be detected based on the change in magnetic field caused by the presence of the magnet.

Additionally, according to some embodiments of the present disclosure, different types of wearable sensor 102 can be used in any number or combination.

The system can include a microcontroller 104 including a wireless transceiver 106, where the microcontroller 104 is in communication with the wearable sensors 102. In FIG. 1, microcontrollers 104a, 104b, 104c (referred to herein individually or collectively as microcontroller 104 or microcontrollers 104) are shown. It should be understood that the number of microcontrollers 104 shown in FIG. 1 is only provided as an example. This disclosure contemplates providing more or less than three microcontrollers. Additionally, this disclosure contemplates that the number of microcontrollers 104 may vary depending on the sensing technology and/or number of users. A microcontroller 104 includes at least a processor and memory (e.g., as shown in box 3002 of FIG. 30). Additionally, wireless transceivers 106a, 106b, 106c (referred to herein individually or collectively as wireless transceiver 106 or wireless transceivers 106) are shown. It should be understood that the number of wireless transceivers 106 shown in FIG. 1 is only provided as an example. This disclosure contemplates providing more or less than three wireless transceivers. Additionally, this disclosure contemplates that the number of wireless transceivers 106 may vary depending on the sensing technology and/or number of users. This disclosure contemplates that the wireless transceivers 106 can be configured to communicate using any wireless protocol known in the art including, but not limited to WiFi and low-power protocols such as the BLUETOOTH or ZIGBEE wireless technology standards.

Figure 11:
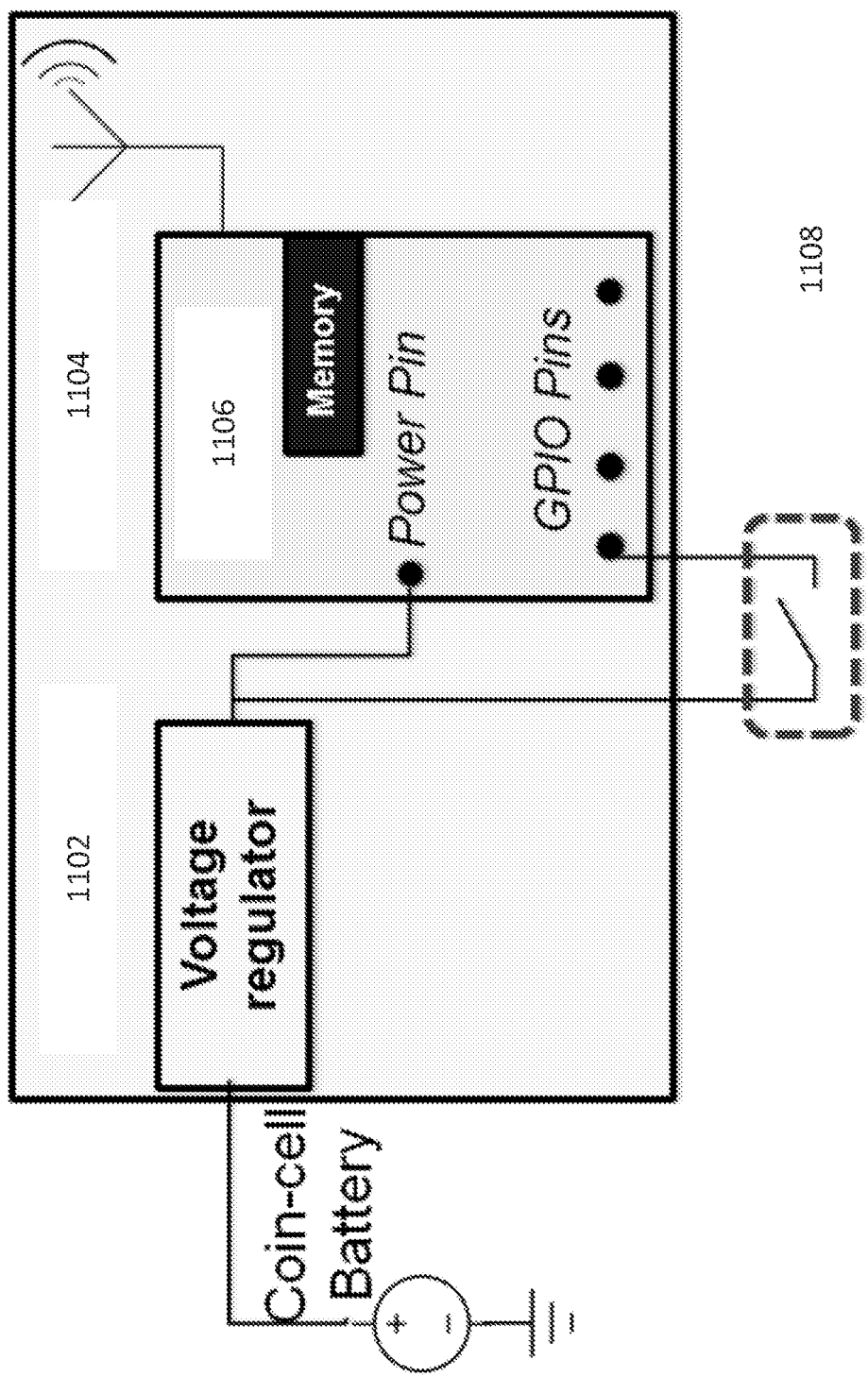
FIG. 11 illustrates a system block diagram of a low-power wireless module (e.g. Bluetooth), antenna, and low-power wireless chip that can function as a microcontroller and transceiver. Low-power wireless modules include, but are not limited to, modules configured to implement the BLUETOOTH wireless technology standard.
Figure 12:
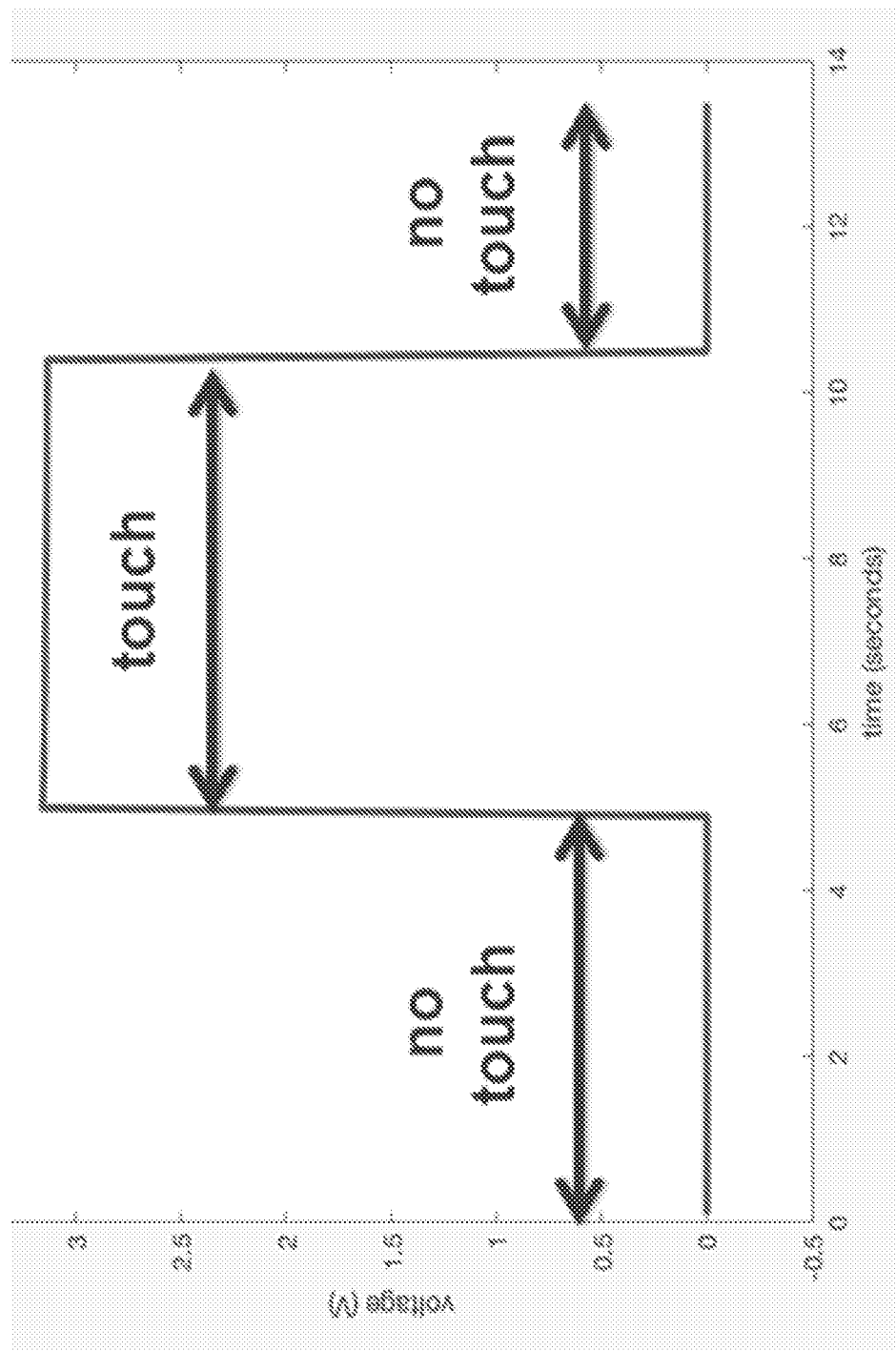
FIG. 12 illustrates a voltage waveform that can correspond to a "touch" in an implementation described herein.

FIG. 11 illustrates a system block diagram of a low-power wireless module 1102, antenna 1104, and low-power wireless chip 1106 that can function as the microcontroller and wireless transceiver shown in FIG. 1. Further, the input 1108 from one or more wearable sensors (e.g., the wearable sensor 102 shown in FIG. 1) is shown in FIG. 11. FIG. 12 illustrates a voltage waveform that can correspond to a "touch" in an implementation described herein. The voltage waveform in FIG. 12 may correspond to the input pin 1108 in FIG. 11. Low-power wireless modules include, but are not limited to, modules configured to implement the BLUETOOTH wireless technology standard.

Figure 13A:
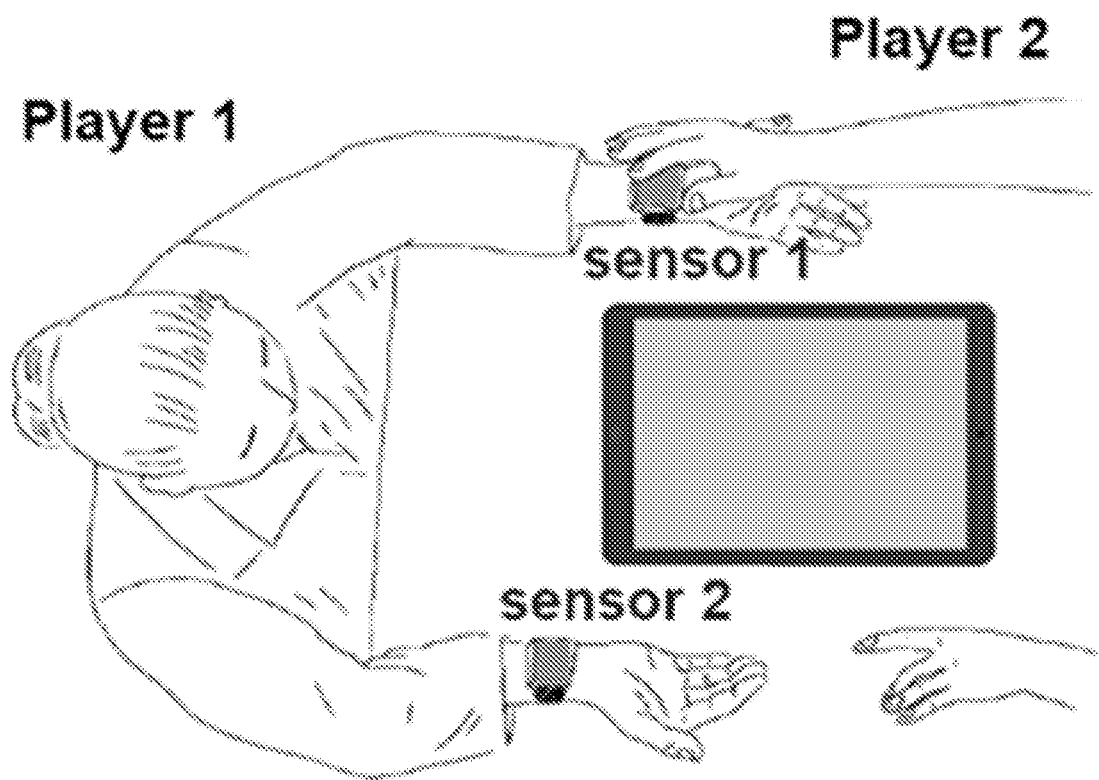
FIGS. 13A-13B illustrate a mechanism of gameplay using wearable sensors including force sensitive resistors (FSRs).

It is also contemplated that the wearable sensor 102 can be a force sensitive resistor (FSR). In some implementations, the FSR includes a force-sensitive material (e.g., Velostat material) disposed between layers of a conductive woven fabric (see e.g., FIG. 15B). In other implementations, the FSR includes a force-sensitive material (e.g., Velostat material) disposed between layers of a conductive embroidered material (see e.g., FIG. 15C). FIG. 13A depicts a gameplay activity that can be implemented, for example using the system 100 illustrated in FIG. 1. The two players can sit facing each other with a mobile device (e.g., tablet) placed in between the two players. Wearable sensors (e.g. in the form of an armband) can be worn by either or both players, depending on their physical and cognitive abilities. The sensors can be FSRs that are specifically designed and optimized for this application and configured so that when a player touches the sensor, an input is sent wirelessly (e.g., via Bluetooth) to the tablet. This input can cause various gameplay functions to occur. Non limiting examples of gameplay functions include causing a frog to jump, a car to switch lanes, a rocket to shoot, or any other response to input. Depending on the number of inputs the game is designed for, more than one armband may be employed. For example, in FIG. 13A, Player 1 may be a child with disabilities and Player 2 may be a parent without disabilities, playing a game with a total of three inputs (touching sensor 1, touching sensor 2, concurrently touching sensors 1 and 2). The present disclosure contemplates that different types of touch or different combinations of touch can accommodate the entire spectrum of mild to severe disabilities, for example by having one player be "active" (i.e. the player who touches sensors located on the other player) and the other player being the passive player (i.e. the player who is touched by the active player). For example, in the system illustrated in FIG. 13A, Player 1 can be considered the "passive" player. Alternatively, multiple players can be considered "active" (i.e., each of two or more players wears the wearable sensors described herein such that each play may be touched by another player).

Figure 13B:
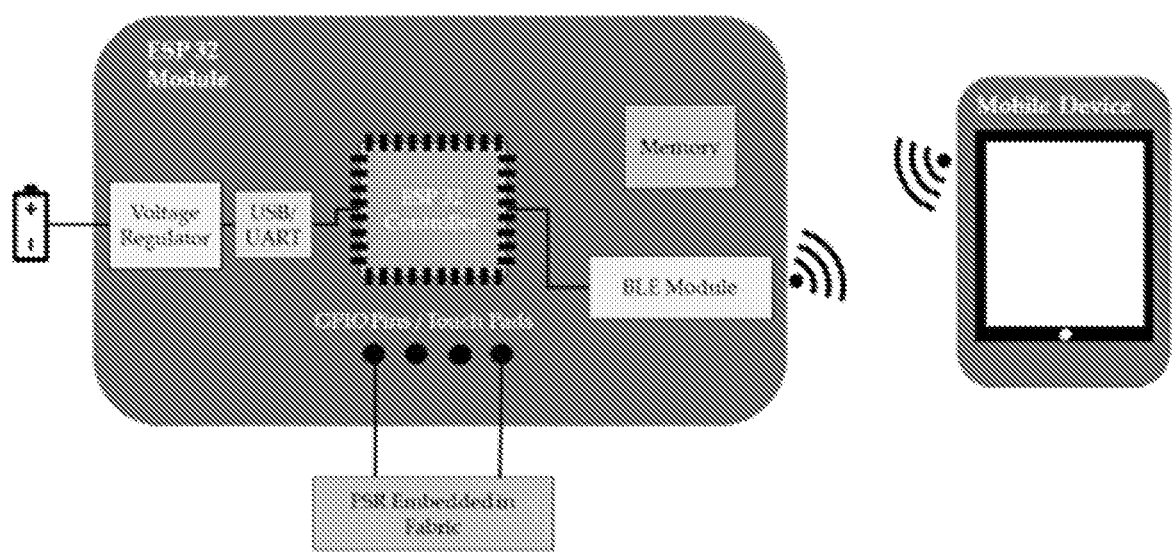
Figure 14A:
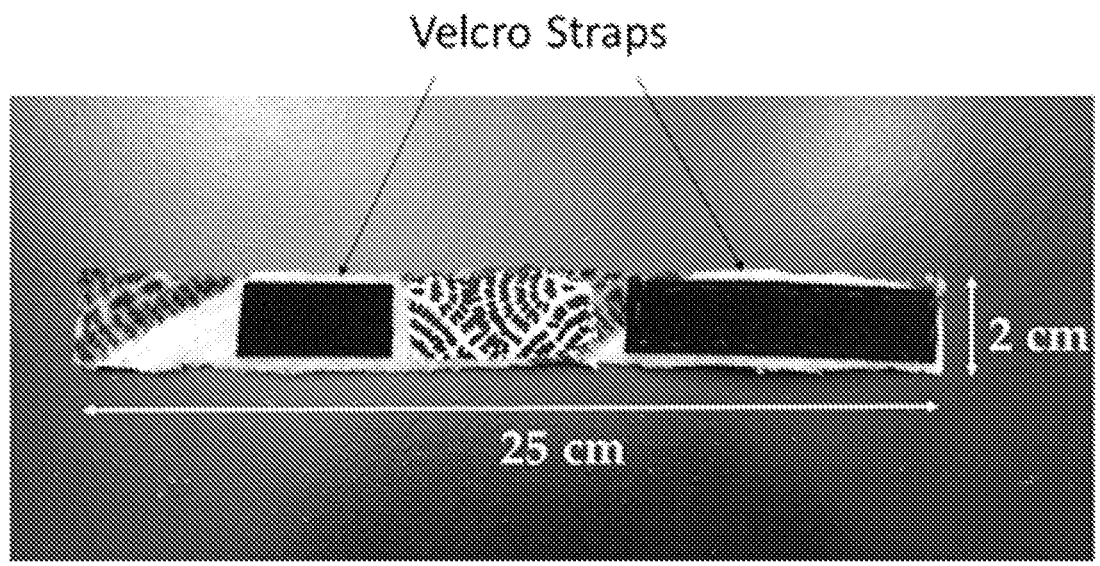
FIGS. 14A-14B illustrate prototypes of wearable sensors including FSRs.
Figure 14B:
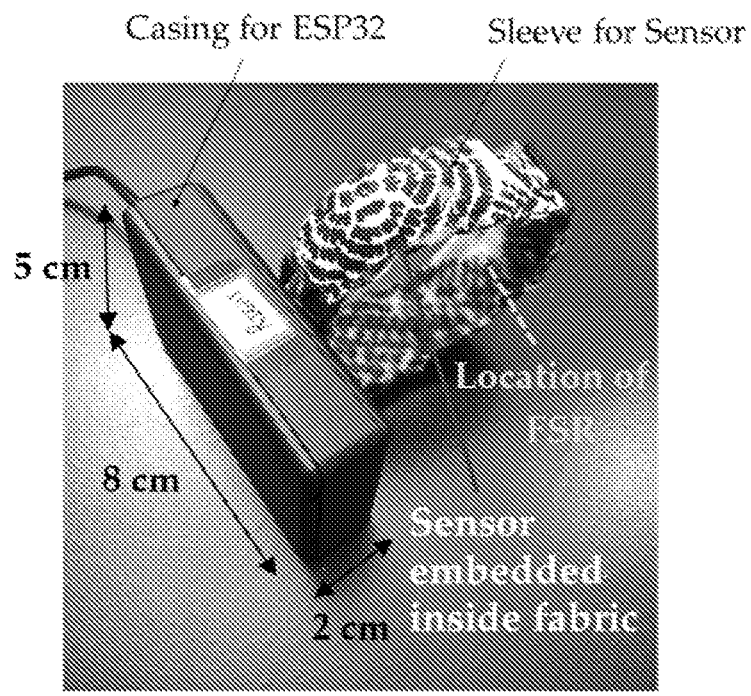

The block diagram of an FSR-based sensor is shown in FIG. 13B. The FSR can be embedded in fabric, the selection of which is subject to optimization as described herein. This fabric integration serves two purposes. First, it keeps the FSR in place and in a comfortable manner for the wearer. Second, it prevents direct contact between the FSR and the human skin, preserving the FSR's electrical properties and minimizing drifts in performance. An example implementation of an armband with embedded FSR is shown in FIG. 14A. This FSR-functionalized armband can be connected to a microcontroller (in this case an ESP32 module developed by ESPRESSIF Systems) using the general-purpose input/output (GPIO)/touch pad pins, as shown in FIG. 14B. The ESP32 is chosen due to its low cost and power consumption. Whenever the FSR senses the touch, it wakes up the ESP32 from deep sleep mode and stores the data in a register of the ESP32 memory. Data from the ESP32 memory can then sent to a mobile device via Bluetooth Low Energy (BLE) and used to control the mechanics of the game. The microcontroller can be powered via a USB cable or by batteries or any other suitable power source. In the armband illustrated in FIGS. 14A-14B, the ESP32 microcontroller operates at 3.3 V and has 500 mA of current handling capacity. The BLE component consumes 130 mA for transmitting data and 95-100 mA for receiving data. This corresponds to 0.429 W of power consumed. Considering 1 hour of active gameplay, the example armband can consume 130 mAh of power. When the ESP32 is used in deep sleep mode, the current consumption is 150 μA, resulting in 0.495 mW or 0.15 mAh. Lower consumption can significantly saves battery life and increases play time. The present disclosure contemplates that the system can be configured to switch between deep sleep and active gameplay (for example based on whether touch is detected) in order to reduce the power consumption of the system.

Figure 15B:
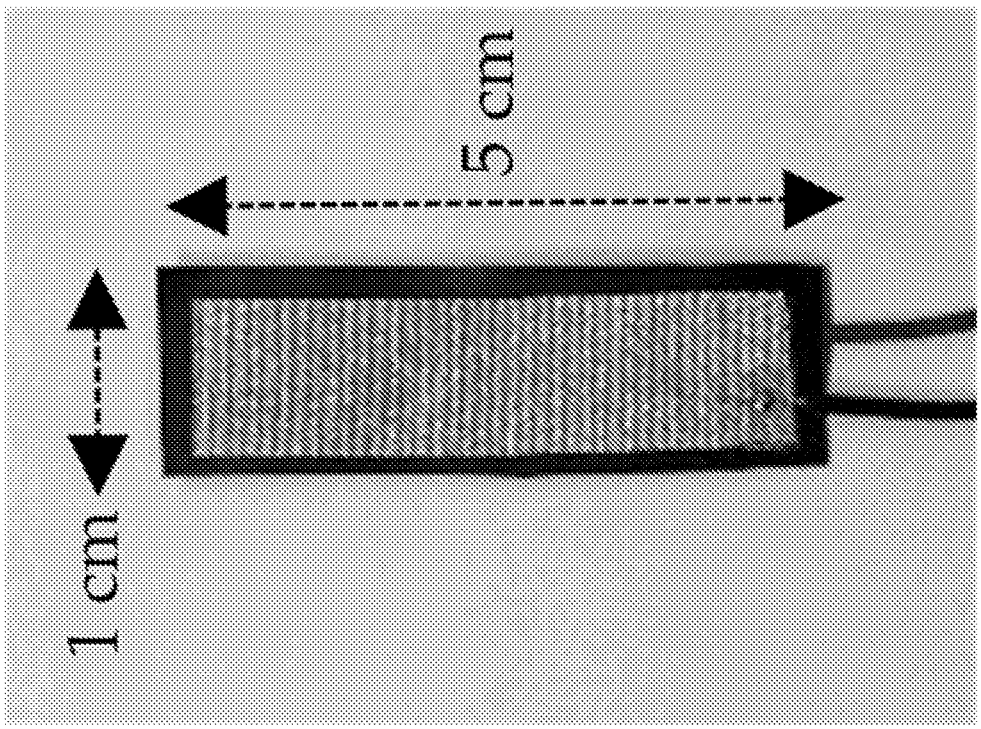
FIGS. 15A-15C illustrate FSR designs according to implementations of the present disclosure.
Figure 15A:
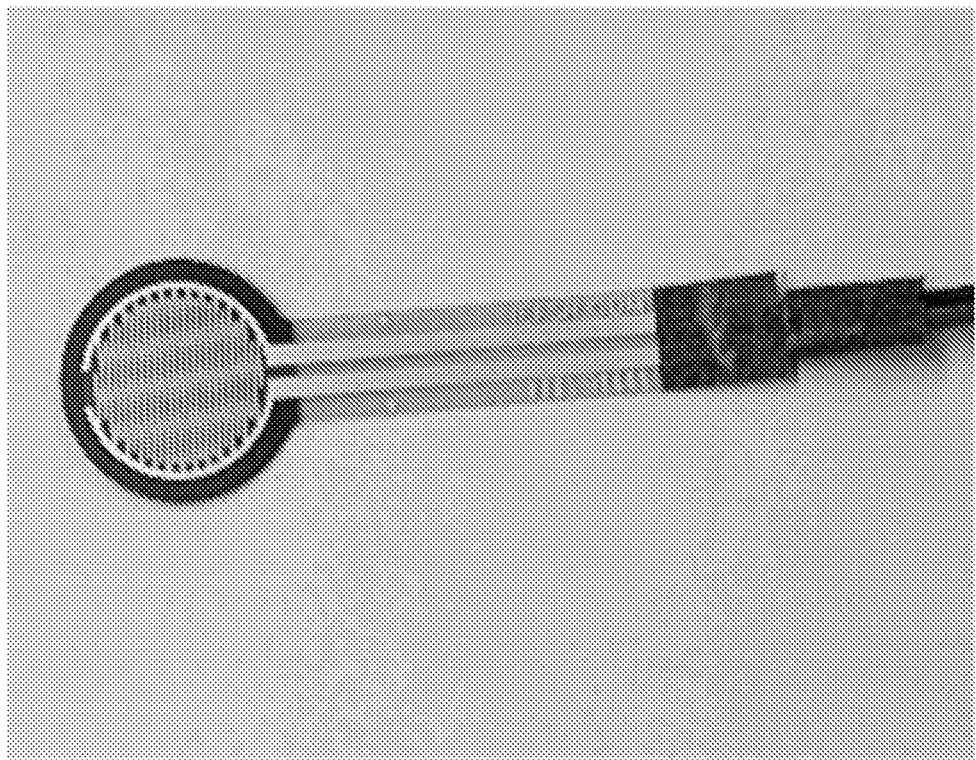
Figure 15C:
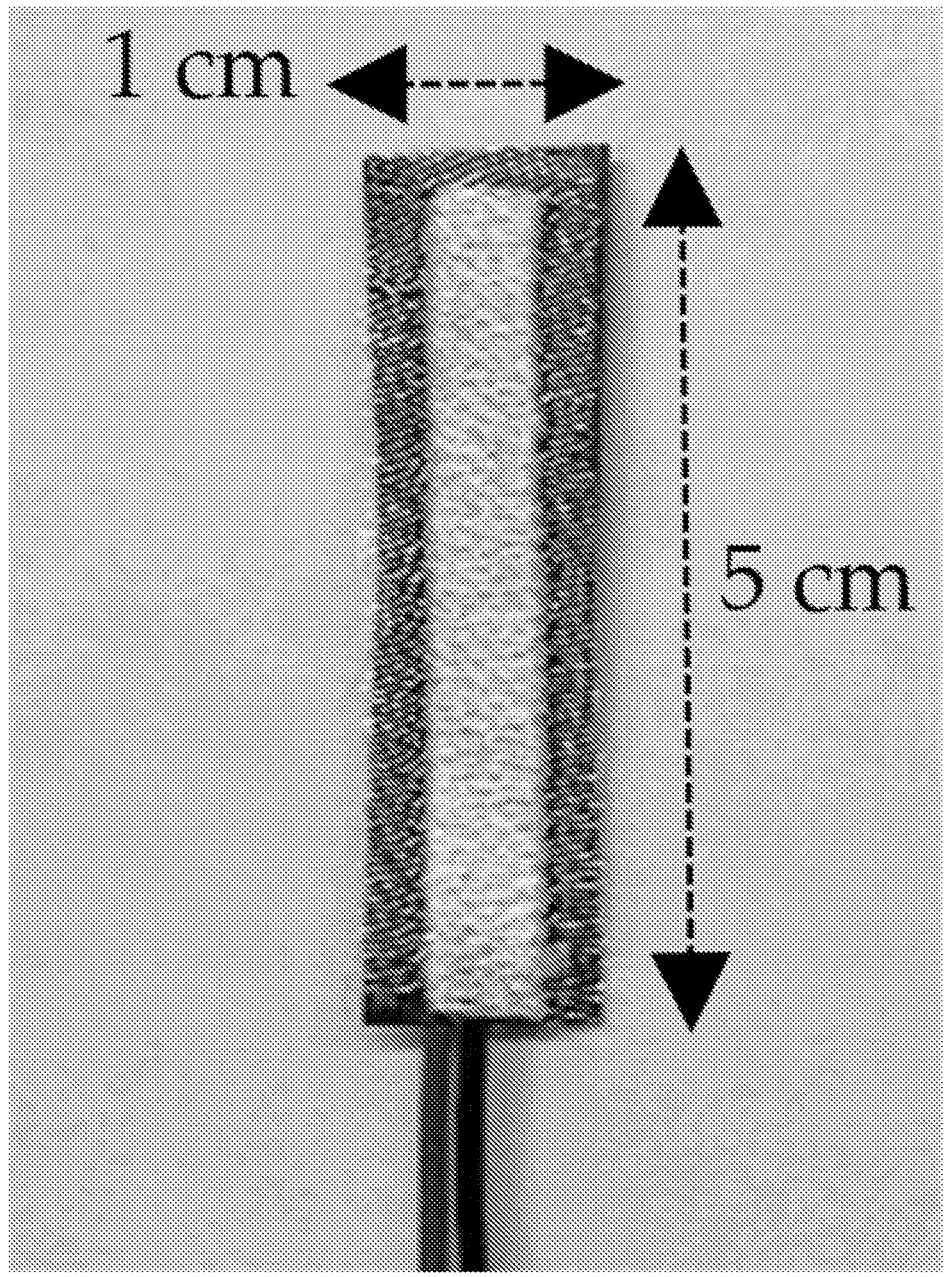

The present disclosure contemplates that the FSR can be a textile-based FSRs optimized for this particular application. As a non-limiting example, the present disclosure contemplates that the FSR can be a woven fabric FSR (e.g., as shown in FIG. 15B) or an embroidered FSR (e.g., as shown in FIG. 15C). An off the shelf FSR is illustrated in FIG. 15A. However, a limitation in the case of the off-the-shelf prototype of FIG. 15A is that it is not mechanically robust. That is, the FSR can easily break or permanently deform over the course of time/gameplay, losing its functionality. This prototype is also not washable/dryable, a major inconvenience for a textile-based sensor. Finally, as demonstrated below, this off-the-shelf sensor can have more false positives than the woven fabric and/or embroidered FSR disclosed herein.

Implementations of the present disclosure include Thrumode FSRs with a section of force sensitive material (sold under the trademark Velostat) placed in between two conductive plates, as having the potential to be implemented fully on textiles. Both FSRs are 5 cm×1 cm in size, selected so as to increase the sensing area when integrated into an armband. It should be understood that the 5 cm×1 cm size is provided only as an example. This disclosure contemplates providing FSRs having other sizes, for example, the FSRs may be integrated into an armband to be worn by a user and the size of the FSRs can be selected to increase the sensing area (wider FSRs) or decrease the sensing area (thinner FSRs).

The first implementation shown in FIG. 15B uses woven conductive fabric made of copper and nickel-plated polyester having surface resistivity of $0.05\Omega$/sq. Woven conductive fabrics are available, for example, from Adafruit Industries, LLC of New York, NY. The force sensitive material (e.g. pressure-sensitive conductive sheets such as VELOSTAT or LINQSTAT) forms a 0.1 mm thick layer sandwiched between the two conducting sheets using a permanent fabric adhesive to form the FSR.

Figure 17B:
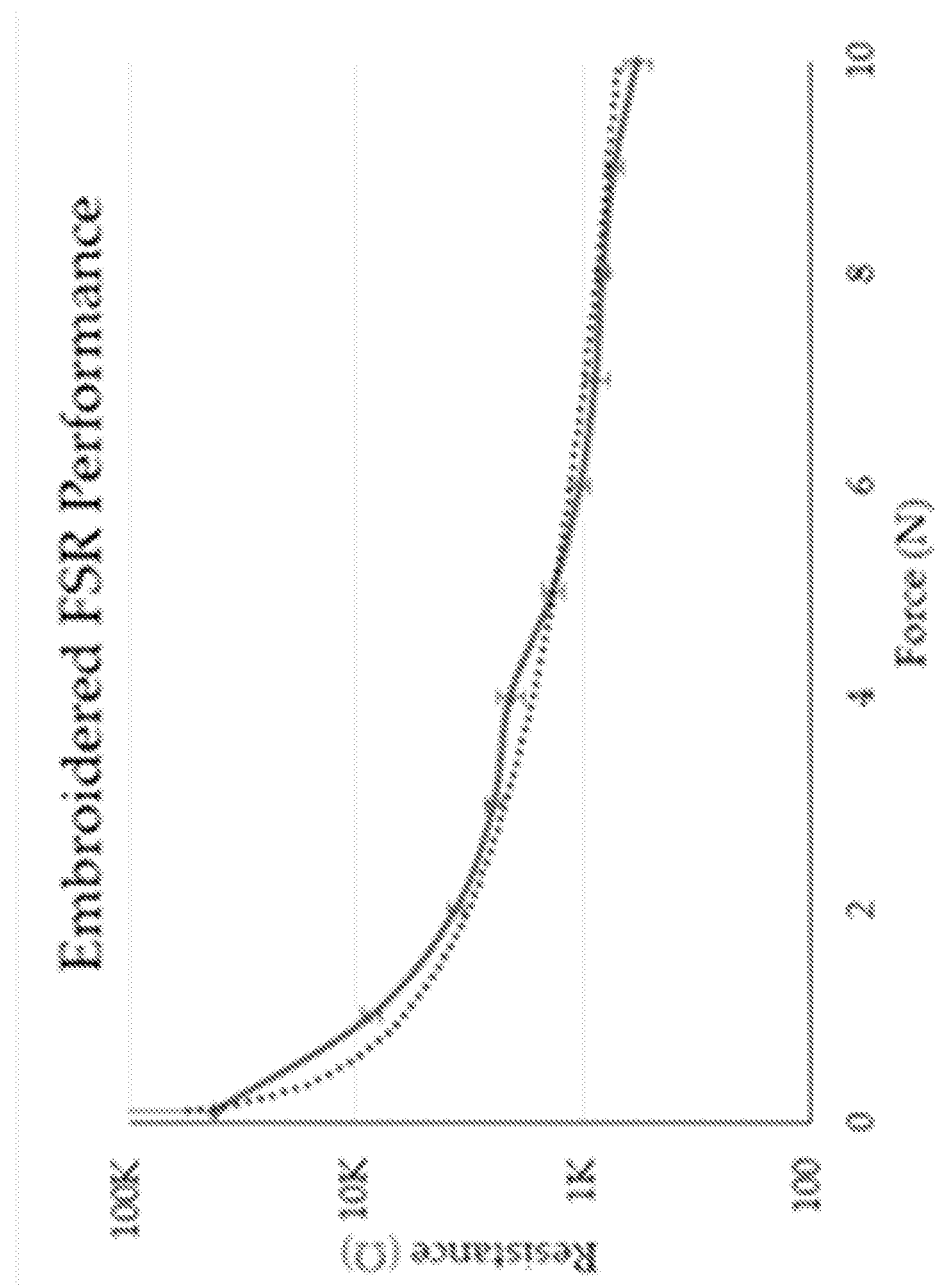
FIG. 17B illustrates a chart showing the performance of an embroidered FSR according to one implementation of the present disclosure.

The second implementation shown in FIG. 15C includes embroidery of 7-filament silver-plated copper e-threads (such as the e threads sold Elektrisola Inc. of Boscawen, NH) exhibiting very low resistivity of $1.9\Omega$/m and fine diameter of 0.12 mm. These e-threads are placed in the bobbin case of an automated Brother 4500D embroidery machine whereas the non-conductive polyester threads are placed in the spool pin. A target design can be first digitized (i.e., the path of the needle is determined) and then embroidered in an automated manner. Selection of high-conductivity e-threads (see resistivity comparison in FIG. 17A) can be used to boost the FSR's sensitivity at low applied forces. Implementations of the present disclosure can include two conductive sides where the force sensitive material sold under the trademark Velostat is adhered in between, using fabric adhesive. The improved conductivity of the embroidered (vs. the woven) surface can improve the FSR's performance. E-threads are also known to be much more tolerant to mechanical deformations, high/low temperatures, and launderability, adding to the benefits of implementations including an embroidered FSR.

Figure 16D:
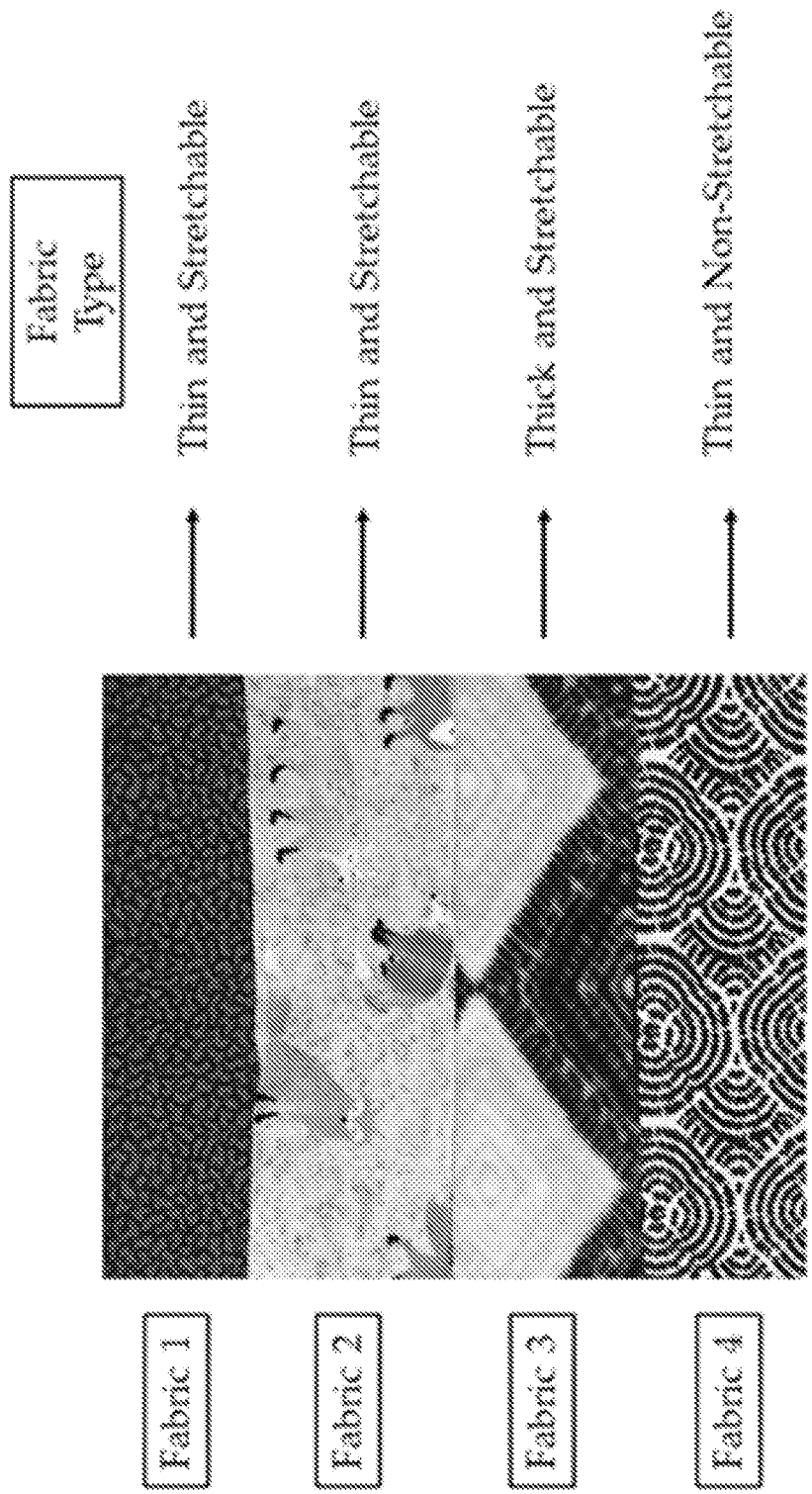

The FSRs described above were tested as described below. The off-the-shelf FSR of FIG. 15A was placed on the forearm, in direct contact with the skin, and when embedded within each of the four fabrics illustrated in FIG. 16D (i.e., Fabrics 1-4). In FIG. 16D, Fabric 1 is a rayon/lycra blend fabric, Fabric 2 is a cotton flannel fabric with lycra, Fabric 3 is a thick fleece fabric, and Fabric 4 is a thick cotton fabric.

FIG. 19 shows the ESP32 register values for the 'no touch' and 'touch' cases, including touches with 1 finger, 2 fingers, the palmar side of the hand, and the dorsal side of the hand. To quantify these touches, the 1 finger touch was estimated as an average applied force of 1N. Similarly, 2 finger, palmer side and dorsal side of the hand are estimated to an average applied force of 2N, 4N and 6N respectively Performance of the embroidered FSR was measured under applied force up to 10 N and the results are plotted in FIG. 17B. Since the objective was to measure small forces, the sensitivity of the FSR was calculated for forces up to 5 N. The applied force is changed from 0 N to 5 N and the corresponding change in resistance value of the FSR is measured. The embroidered FSR is non-linear up to 2 N and further exhibits a relatively linear relationship up to 10 N. The maximum deviation of the resistance value from the nominal resistance for an applied force is 12% at 4 N, while for all other cases, the deviation is less than 10%. The reliable dynamic range of the embroidered FSR sensor is up to 20 N. However, the data was only plotted up to 10 N since the range of operation for touch-based operation is less than 10 N. The dynamic range and sensitivity can be altered by adjusting the stitching density of the embroidery. Compared to previously reported embroidered FSRs (see FIG. 17A), the embroidered FSR described herein exhibits significantly higher sensitivity. As such, it can be readily implemented to detect small forces, such as one finger touch.

When the sensor is placed on curved surfaces such as an arm, the sensor deforms which can result in decreased sensitivity to applied forces. The performance of the FSR sensor on different curvatures is illustrated in FIG. 18. To account for different curvatures and understand the effect on the FSR performance, the off-the-shelf FSR of FIG. 15A was placed on three different locations, viz. forearm, palmar side of the hand, and dorsal side of the hand. ESP32 register values are recorded during 'no touch' and 'touch' and summarized in FIG. 18. In this non-limiting example, a 1-finger touch was considered as a worst-case scenario (i.e., gentle touch ~1N of force) to help assess the sensor's sensitivity. As seen, Fabric 3 provides the best dynamic range in this example, validating the results illustrated in FIG. 18. Placement of the sensor on the forearm provides poor results as compared to the palmer/dorsal side of hand, especially when placed directly on skin. This is because the sensor is less conformal, implying that a relatively flat/uniform surface is better to place the sensor on. For this non-limiting example, it was observed that placement of the FSR sensor on the palm-side of the hand provides the best performance, followed by placement on the forearm, and then placement on the dorsal side of the hand. This is because sensor deformation degrades performance resulting in poor sensing capabilities of the FSR, as also shown in FIG. 18. Implementations of the present disclosure target gameplay for children with disabilities who may have contracted limbs (e.g., arms, hands and fingers curled inwards), and, thus, proceed with placing the FSR sensor on the forearm. Of course, this is not limiting and may vary per application scenario.

Referring to FIG. 19, when someone touches the FSR, the voltage drops across the touch pin of the ESP32 microcontroller, causing the values in the ESP32 register to drop as well. It can be observed in FIG. 19 that the small thickness of Fabrics 1 and 4 can provide reduced isolation of the FSR sensor from the skin, causing reduced dynamic range. Fabrics 2 and 3 provide better dynamic range. Thick fabrics are therefore preferred for applications that require greater dynamic range. Taking all listed touches into account, the maximum change in register values for 'touch' vs. 'no touch' is the highest when using the stretchable thick fabric, referred to as Fabric 3 in FIG. 16D. This is because its thickness provides good isolation from the skin, while its elasticity preserves the shape of the FSR. Thick and elastic fabrics are, hence, considered for the further analysis with textile-based FSRs for the proposed application and the implementations described herein used the textile FSR sensor in Fabric 3. Again, implementations including fabric 3 are intended only as non-limiting example implementations, and the use of other fabrics is contemplated by the present disclosure.

Three FSRs were embedded in Fabric 3, and the resulting armband was placed on the forearm to record the ESP32 register values during 'no touch' and 'touch' in FIG. 18. Same as in FIG. 17A, four different types of touch are considered to account for different mechanics of gameplay. Referring to FIG. 20, textile-based FSRs are promising substitutes to off-the-shelf FSR sensors. Both woven and embroidered FSRs (e.g., shown in FIGS. 15B and 15C, respectively) exhibit a dynamic range that is suitable for differentiating between 'no touch' and 'touch' cases. Nevertheless, the embroidered FSR (e.g., shown in FIG. 15C) disclosed here considerably outperforms the woven FSR (e.g., shown in FIG. 15B) and the off-the-shelf FSR (e.g., shown in FIG. 15A) via an impressive dynamic range that can minimize false positives. An additional 50 trials were performed where the sensor was randomly touched in different orientations and configurations as outlined in FIG. 21. This can be important for implementations of the present disclosure used with players who have motor disabilities that can prevent them from being able to precisely touch the sensor. The error rates associated with the embroidered FSR (e.g., shown in FIG. 15C) are much smaller vs. those of the woven FSR (e.g., shown in FIG. 15B) and the off-the-shelf FSR (e.g., shown in FIG. 15A). The reason for significant improvement in the embroidered FSR is the very low resistivity of e-threads, as indicated above. Additionally, in some implementations of the present disclosure, the ability to control the stitch density based on the application allows improvement in flexibility and conformability of the FSR sensor, reducing the number of false positives, as illustrated in FIG. 21.

Additionally, the present disclosure contemplates that the embroidery density can be adjusted to optimize one or more characteristics of the FSR. In the implementation of the embroidered FSR of FIGS. 20 and 21, the embroidery used a density of 4 e-threads/mm. In FIG. 22 three embroidered FSRs of different e-thread densities are compared: 1 e-thread/mm, 4 e-threads/mm, and 7 e-threads/mm. The experimental setup embeds these three embroidered FSRs in Fabric 3, places the bands on the arm, and evaluates 'no touch' vs. '1-finger touch' cases. As seen, the embroidery density of 4 e-threads/mm performed the best, and in this implementation of the present disclosure was considered a desirable compromise between conductivity and mechanical performance. This is because, at 1-thread/mm, surface conductivity of the FSR is poor. And at 7 e-threads/mm, surface conductivity is improved, but the resulting thickness and stiffness of the FSR increase the chance of the top and bottom conductor pressing against each other. In turn, this lowers the cut-off for the 'no touch' scenario degrading the sensitivity to detect touch.

The wearable sensors including FSRs disclosed herein provide a solution for enabling collaborative digital gaming and other touch-based solutions in various implementations of the present disclosure. The textile based FSRs disclosed herein can replace off-the-shelf FSRs and can make the resulting sensor more seamless and durable. In particular, embroidered FSRs provide high control over the resulting conductivity and mechanical performance, enabling optimized sensors with minimal false positives in detecting 'touch' vs. 'no touch'.

In some implementations of the present disclosure, the sensing element was separated from the human skin, for example by fabrics. Thickness and stretchability factors were considered as part of to optimize performance. It was found that thick and stretchable fabrics work the best. It can be noted that the experimental results illustrated in FIGS. 18 and 19 were performed using off the shelf FSRs, which can be the worst-case scenario. In-house FSRs (woven fabric/embroidered as shown in FIGS. 15B and 15C) can be designed to be conformal to the arm i.e., forearm, palmer/dorsal side and so on, as per requirements of the user, thus reducing errors seen in off the shelf FSRs. Fabric 4 was chosen in the same way because of the skin isolation it provided. As a result, the performance of any type of FSR on a similar fabric type can be identical.

The resulting armband can then be designed in any form factor for different implementations of the present disclosure. As a non-limiting example, a small width of 2 cm for the armband of FIG. 14A to minimize fabric coverage upon the arm and enhance skin-to-skin contact between the players. Similarly, sensor placement upon the human body may vary per application needs, though performance was shown to improve upon flat/uniform areas. Various types were also explored, and robustness of the idea was confirmed in all cases. Overall, multiple possibilities can be explored should the designer have a specific game application and target demographic in hand.

On a system level, 'touch' and 'no touch' inputs can be registered on an ESP32 microcontroller and transmitted wirelessly via Bluetooth to a remote mobile device (e.g., tablet). ESP32 in deep sleep mode and BLE mode of operation are ideal for reducing power consumption and increasing the time of play. Implementations of the present disclosure can be powered by any suitable source, including a power bank, Li-Ion or Li—Po batteries. Non limiting examples of battery sizes that can be used include rechargeable batteries with capacities ranging from 150 mAh to 2500 mAh.

The present disclosure also contemplates seamless sensor designs by implementing shunt-based FSRs on embroidered e-threads. Textile-based piezo-resistive materials can also be used to replace the pressure sensitive conductive sheet used in implementations of the present disclosure and enable fully-textile substitutes for the FSR sensors. Finally, the present disclosure contemplates that multiple FSR sensors can be used to further expand the sensing area and potentially improve the resulting sensitivity.

The present disclosure includes classes of wearable sensors functionalized with FSRs were reported for touch-based collaborative gaming and illustrates how those sensors including FSRs can be implemented as part of a system configured to allow two or more players to play a game. An off-the-shelf FSR was originally selected and connected to an ESP32 microcontroller to ultimately transfer data to a remote tablet in a wireless manner. In some implementations, placement of the sensor directly on the skin compromised performance and therefore in other implementations of the FSR fabrics placed in between the sensor and the skin. Four different types of fabrics were tested, indicating that thick and stretchable options were the most suitable. Multiple on-body locations were analyzed for the sensor and placement on the palm-side of the hand was identified as optimal for some implementations of the present disclosure, followed by placement on the forearm. Depending on the application and target audience, different placements can be used. Furthermore, the present disclosure contemplates that different touch scenarios can be used to account for the physical disabilities of the players. Finally, textile based FSRs were disclosed, including an embroidered FSR with sensitivity to low applied forces, and implementations of the present disclosure can also include a variety of stitching densities for different types of gameplay.

As an example, application, this work intends to enhance bonding between children with disabilities and their parents without disabilities. However, numerous other applications may be considered for diverse age groups and/or medical conditions. Implementations of the present disclosure include sensors that can also be used for textile-based force sensing alternatives, such as pressure sensing mats for bed-bound patients or pressure sensitive socks for sprinters and marathon runners.

The present disclosure contemplates that the wearable sensor(s) 102 used as part of the system 100 illustrated in FIG. 1 can be configured to detect touch using different techniques. As a non-limiting example, the present disclosure contemplates that the wearable sensor 102 can include acoustic sensing, which can use the propagation of sound waves through the body to sense the desired event.

Non-limiting examples of acoustic sensors include an arm band with four transmitters with a finger mounted receiver, and an armband with two transmitters and two receivers. For the first configuration, gestures such as sliding and pressing on the forearm can be detected with 98.21% accuracy. Discrete touch positions were also able to be identified with 79.96% to 98.96% accuracy depending on the touch position. For the second configuration, arm grasping distances can be detected with 86.24% accuracy.

Another implementation of acoustic sensing can sense the sound which propagates through the body when a user taps skin near the device. This technique can identify touch at various locations with accuracies ranging from 85.62% to 97.15%.

The present disclosure also contemplates that the wearable sensor 102 can use depth sensing methods to detect touch. Depth sensing methods use the ability to sense the position of objects in space to detect skin touches. A difference between the implementations can be the position of the proximity sensors. As a non-limiting example, the depth sensor used can be a single forearm mounted depth sensor combined with machine learning techniques to detect touch on the hand. As another non-limiting example, 10 wrist-mounted depth sensors can be used to sense touches within 15 cm of the device. Additional non-limiting examples of depth sensors that can be used in implementations of the present disclosure include four depth sensors configured to detect touch within very close proximity of the device, and a watch or watch band in which depth sensors are configured to detect deformation of the skin under the watch.

In some implementations of the present disclosure, the wearable sensor 102 can use magnetic field sensing to detect touch via a magnetic field generated by a permanent magnet and magnetic field sensors. A permanent magnet can be placed on the finger used for interaction, and magnetic field sensors can be placed on other fingers. These systems can be useful for sensing gestures.

In some implementations of the present disclosure, the wearable sensor 102 can use an electrical impedance method to detect the impedance between two electrodes on the body. This method can work by detecting when the current path is changed between the electrodes by sensing an impedance change which can indicate a touch has been detected.

In some implementations of the present disclosure, the wearable sensor 102 can include two bands with twelve electrodes to detect the location of a touch between the two bands on the forearm. This can determine the location of press or touch on the body. As a non-limiting example, sensors that include one or more bands and electrodes can be used in implementations of the present disclosure configured to include one passive player and one active player.

In some implementations of the present disclosure, the wearable sensor 102 includes electrical field sensing. Electric field sensing utilizes an electromagnetic transmitter and receiver to detect touch. As a non-limiting example, a wearable sensor 102 placed on the wrist transmits from an antenna and senses the electric field with electrodes. When a touch occurs, the electric field changes which can be used as user input. As another non-limiting example, a wearable sensor 102 can transmit via a ring on the finger used for touch and sense via electrodes placed on the wrist. These implementations of the present disclosure can include aspects of human body communication, as described below.

It should be understood that the examples of wearable sensors 102 in the present disclosure are intended only as non-limiting examples. For example, any number of sensors (i.e. electrodes and bands) can be used, and the present disclosure contemplates that they can be placed at any location on any body part. Additionally, the present disclosure contemplates that the wearable sensors 102 disclosed herein can be combined with one another, for example, a wearable sensor 102 with electrodes configured to detect the location of a touch can be combined with a wearable sensor 102 including an acoustic sensing technique.

Implementations of the present disclosure can include human body communication (HBC). Human body communication uses the human body as a channel for a propagating electric signal. There are two primary methods for executing HBC—capacitive and galvanic coupling. Capacitive coupling, illustrated in FIG. 23A, relies on the two devices' ground planes coupling to the environmental fields and the devices' signal electrodes coupling to the human body. The intra-body coupled electric field induces a current from one electrode to another which returns along the ground path. Capacitive coupling seems can be most effective from 1 to 200 MHz. Galvanic coupling, as illustrated in FIG. 23B, operates on similar principals, but the ground is coupled to the body rather than the environment by placing the ground electrode on the body. Galvanic coupling can operate from 10 kHz to 100 MHz and can be more effective in areas of muscle.

The present disclosure contemplates the use of HBCs including galvanic or capacitive techniques. In models of a capacitive system, for example, a two-person system can have an additional 10.2 dB of attenuation over the one-person system. For galvanic, one- and two-person systems were not compared, but, for the two-person system, the attenuation between the transmitter and receiver was between 26 and 36 dB from 100 kHz to 5 MHz. The present disclosure also contemplates that the HBC sensor can include both capacitive and galvanic coupling.

As a non-limiting example an HBC can operate at 10 MHz and the electrodes can be two 3 cm×2 cm rectangles. A ground plane can be placed 1 cm above the electrodes and connected to the ground electrode by a short and the signal electrode by a feed point. The electrode structure seems to put this device under galvanic coupling; however, it operates at a higher frequency and the circuit board ground plane may couple with the environmental fields, leading to more of a capacitive coupling effect. In some implementations, simulations show that it is not necessary to use a whole-body model, as most of the fields are concentrated around the hand when the device is placed on the forearm. Additionally, further simplification was possible as a rectangular prism approximately the dimensions of an arm mimic the field distribution of a hand. Through simulation, it was also determined that the ground electrode can be used to create the electric field around the arm.

Experiments on human phantoms also verified this design. It can be more effective to place the electrodes in line along the longitudinal direction of the arm, rather than perpendicular to the longitudinal direction. Additionally, an experiment regarding the signal path was also completed. A large conductor plate was placed around the arm between the receiver and transmitter with varying gaps between the arm and the plate. The gap between the conducting plate and all sides of the phantom was changed and with no gap, there was nearly no signal transmitted. When the gap was increased to 1 cm between the surface of the phantom and the conductor plate, a significant amount of the signal passed through. Therefore, in some implementations, the dominant signal path can be along the surface of the arm and not in the arm or free space.

Figure 24:
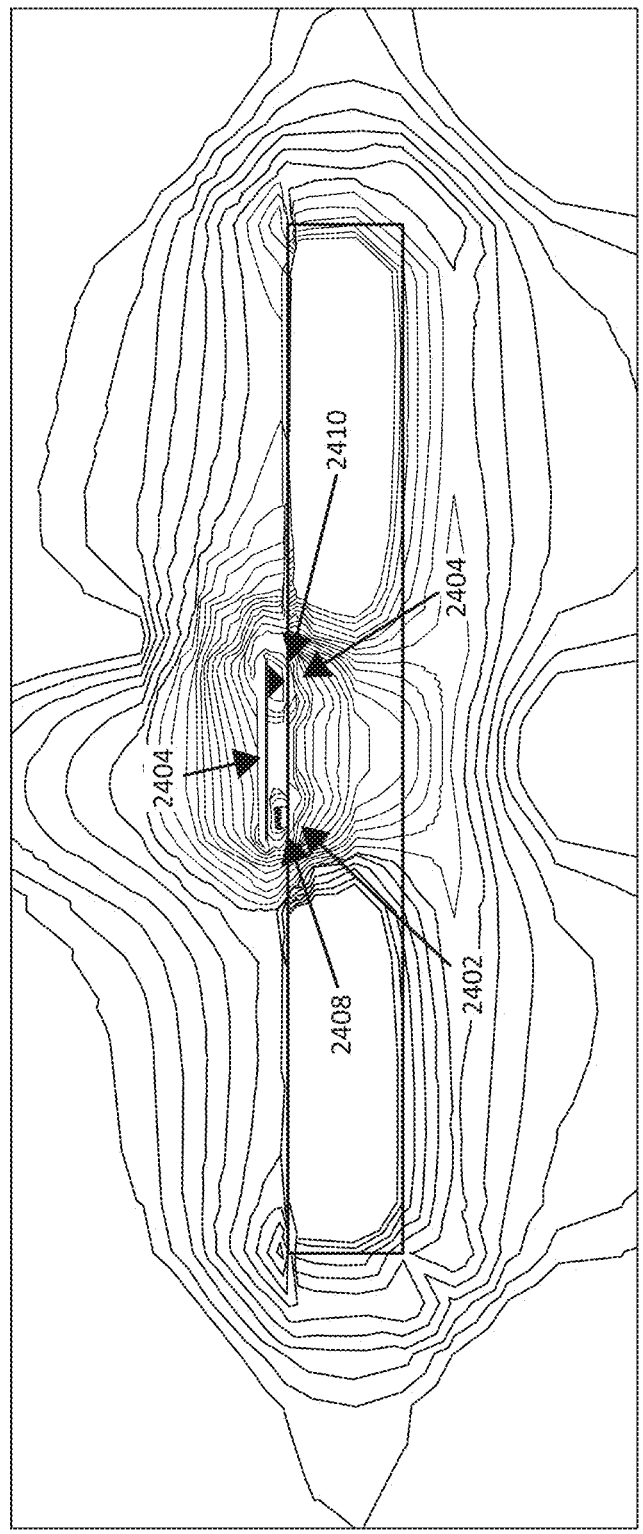
FIG. 24 illustrates a simulation of an HBC including a ground electrode and signal electrode according to one implementation of the present disclosure.

A simulation of a system for HBC according to one implementation is illustrated in FIG. 24. The system simulated includes two 3×2 cm electrodes 2402, 2404, a ground plane 2406, a short 2408 between the ground electrode 2402 and ground plane 2406, and a port 2410 between the ground plane 2406 and signal electrode 2404. As described above, the electric field is concentrated around the edges and ends of the "arm". The phantom is a rectangular prism with dimensions 45×5×5 cm, a relative permittivity of 113.82, a conductivity of 0.41122 S/m, and a density of 1000 kg/m$^3$. This disclosure contemplates that HBCs may operate at frequencies in a range between about 10 kHz and 200 MHz. It should be understood that the 3 cm×2 cm size is provided only as an example. This disclosure contemplates providing electrodes having other sizes. For example, providing electrodes having sizes larger than the example would be feasible but not necessarily aesthetically pleasant to the user. Additionally, providing electrodes having sizes smaller than the example may provide ergonomic advantages.

Figure 25:
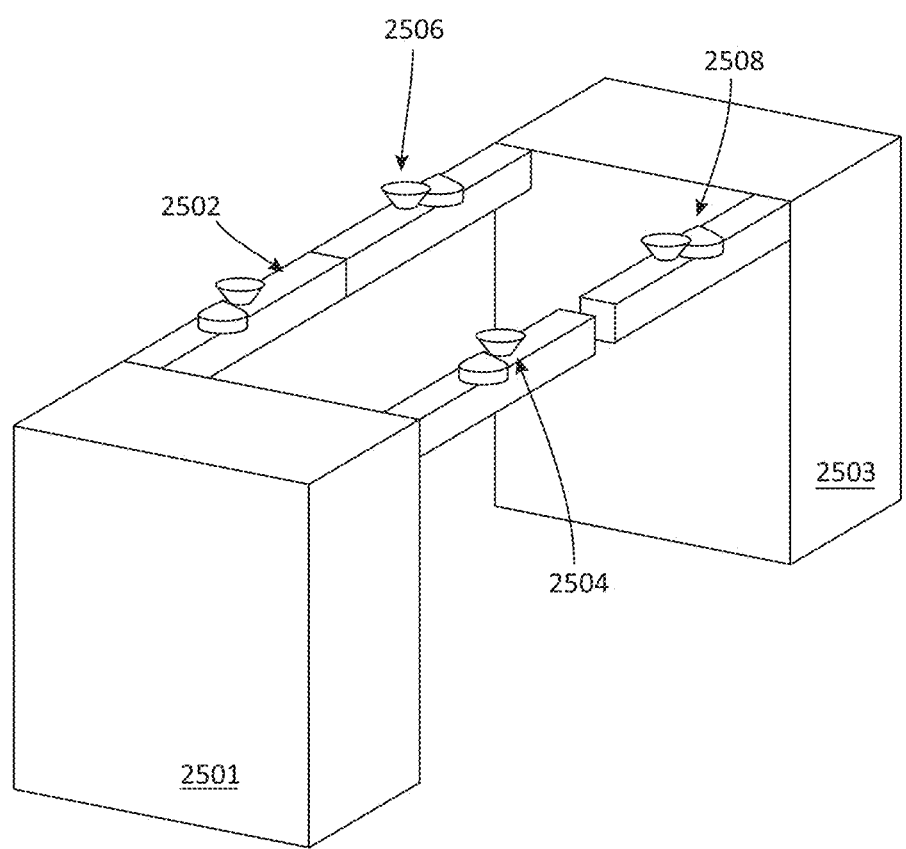
FIG. 25 illustrates a simulation of two pairs of HBC sensors in a simulation of an implementation of the present disclosure with four HBC sensors.

A system using sensors including HBCs was also simulated. In this simulation, each of two users is provided with a pair of HBC sensors. As shown in FIG. 25, a first user is provided with HBC sensor 2502 and HBC sensor 2504, and a second user is provided with HBC sensor 2506 and HBC sensor 2508. The simulation consisted of two bodies 2501 and 2503, each with a torso and two arms. On each arm is an HBC device as described above. This geometry of this simulation can be seen in FIG. 25. The dimensions of the arms were 45×5×5 cm and the torso was 47×39×26.75 cm. The relative permittivity is 113.82, the conductivity is 0.41122 S/m, and the density is 1000 kg/m$^3$. The devices were placed 19 cm from the end of each arm. In order to evaluate the difference in the signal power for touching versus not touching, transmission coefficients were evaluated for touching arms (on left in FIG. 25) and non-touching arms (on right in FIG. 25). For touching arms at 10 MHz, the transmission coefficient between devices 1 and 2 (ports 1 and 2) is −39.4 dB and for not touching (ports 3 and 4) it is approximately −58 dB. Accordingly, the difference between the touching and not touching arms can be detected.

It was also determined that jewelry, metal inside the wrist, or rubber gloves can be insignificant compared to the transmission coefficient. In some implementations, modifying the electrode size can significantly affect the transmission coefficient. The results of these simulations can be found in FIG. 26.

Figure 27:
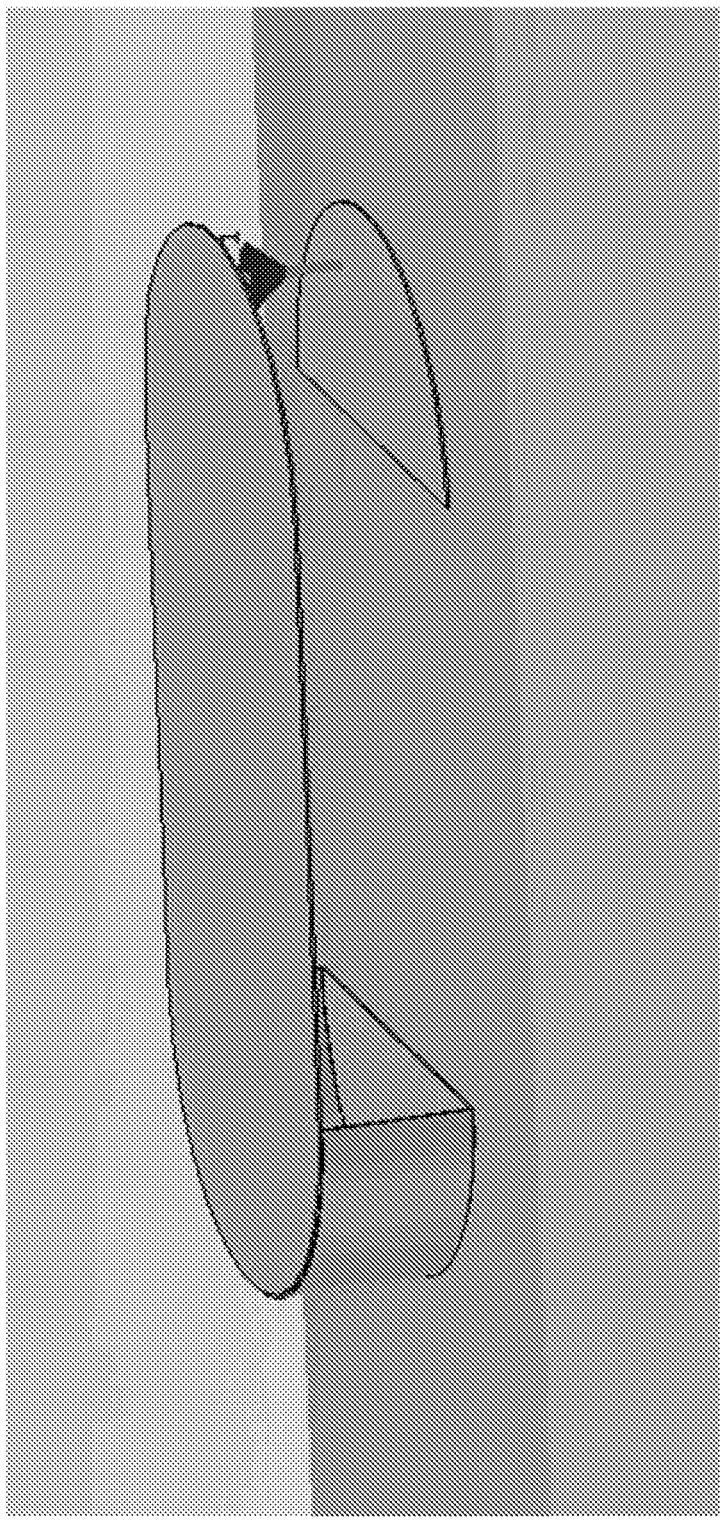
FIG. 27 illustrates a simulation of an HBC sensor, according to one implementation of the present disclosure.

Implementations of the present disclosure can include semi-circular electrodes instead of rectangular. This can increase the electrode area while also helping with the design aesthetic of the device. Simulations showed that in some implementations of the present disclosure, changing from 3×2 cm rectangular electrodes to semi-circular with a radius of 1.5 cm in one direction and 2 cm in the other does not make a significant difference in transmission coefficient. Additionally, the ground plane can be connected to the ground electrode via another ground plane, which can be more easily realized in manufacturing instead of a small short through the middle of the device. An illustration of this embodiment of the device is shown in FIG. 27.

One concern is ports 2 and 3 not being able to distinguish between a single touch from one hand vs touching with both hands. Technically, this would manifest in a small difference between $|S_{21}|$ and $|S_{31}|$. The simulation showed that this is unlikely due to the $|S_{31}|$ being −56.57 dB. This leaves a difference of 17.19 dB between $|S_{21}|$ and $|S_{31}|$. All simulations were created using CST Studio.

Figure 28A:
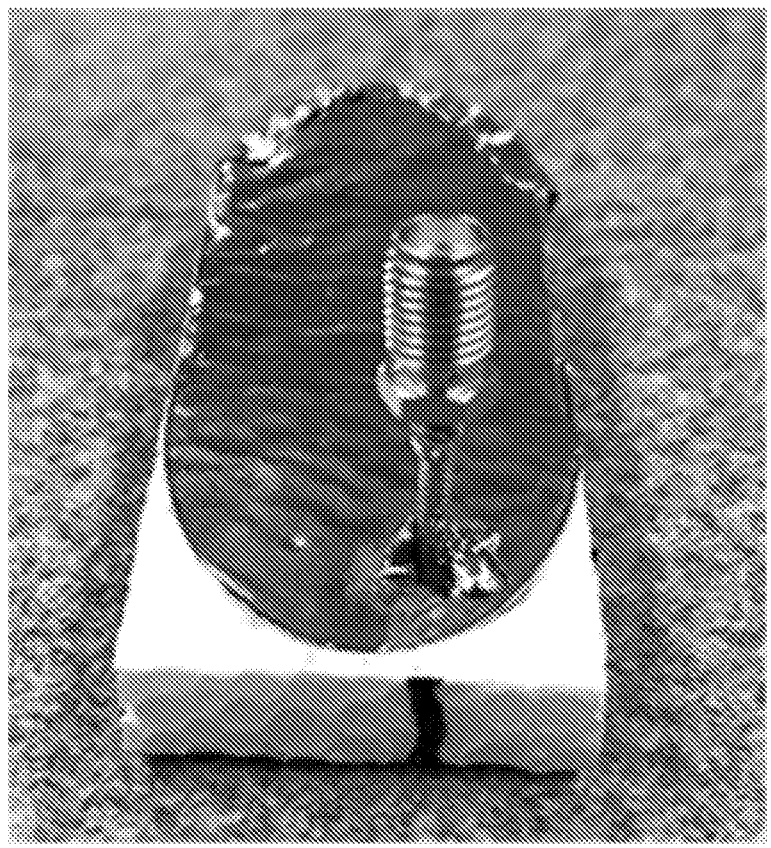
FIGS. 28A-28C illustrate views of an HBC sensor, where
Figure 28B:
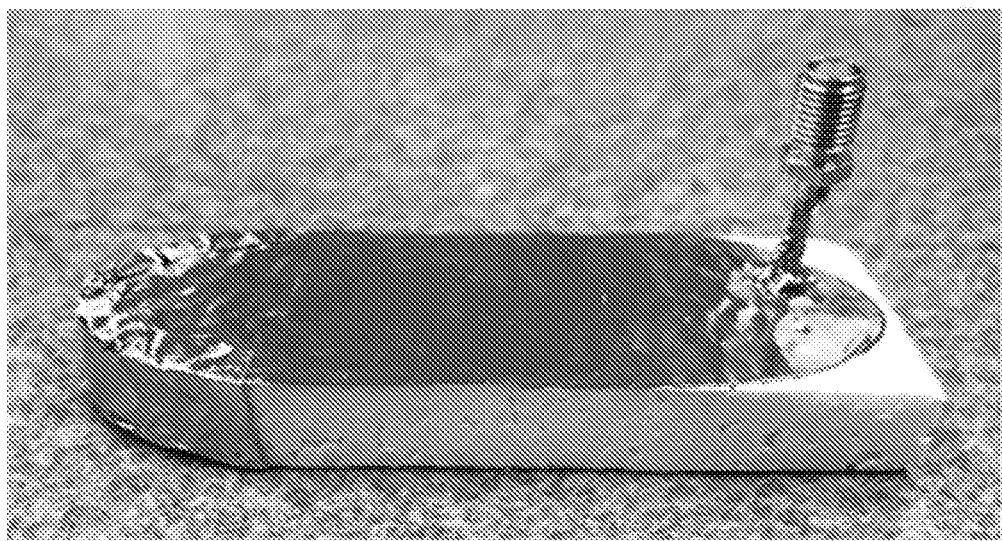
Figure 28C:
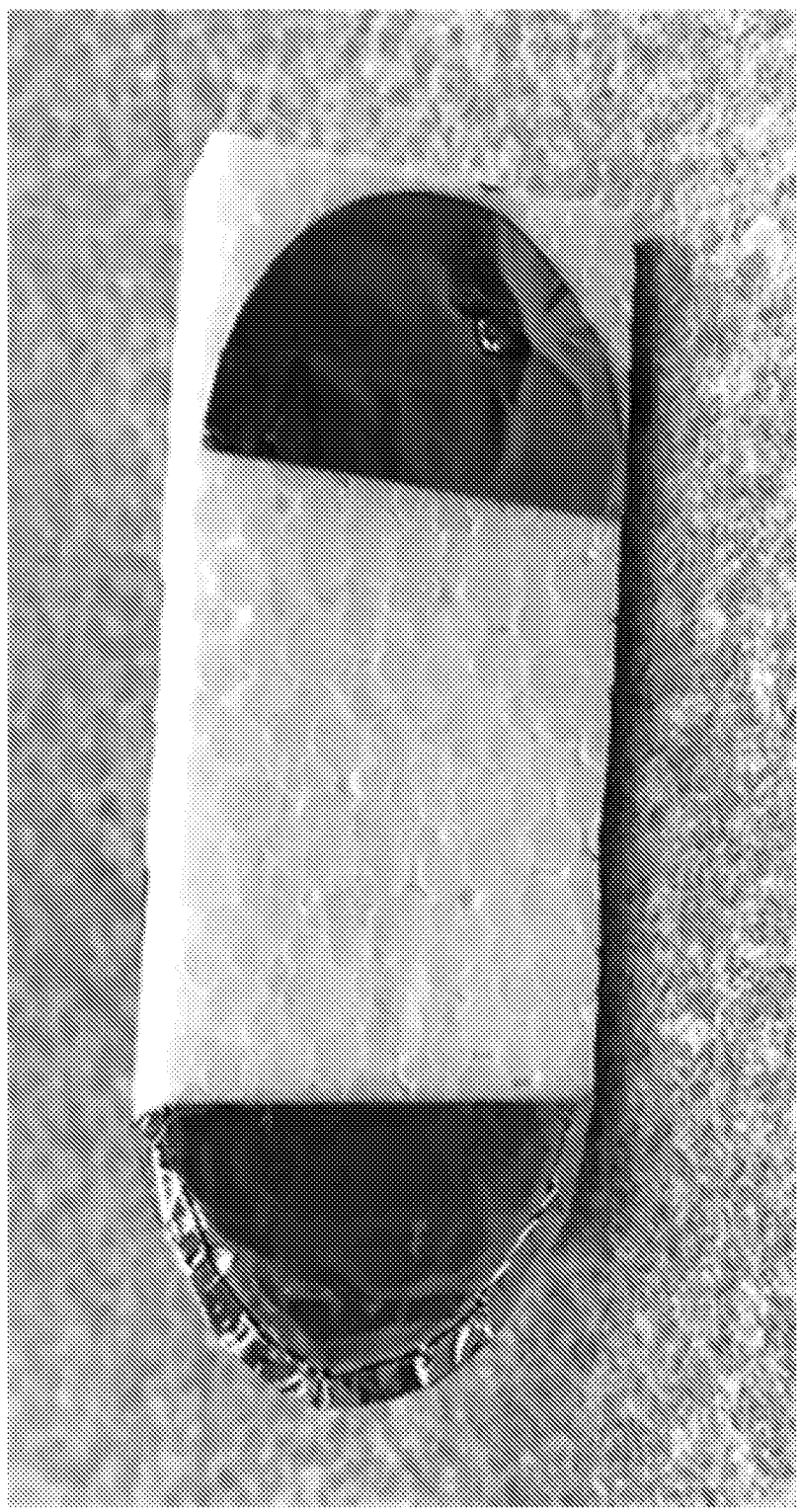

After a manufacturable design was established, a prototype was created. Four pieces of copper tape were attached to a pre-cut piece of Styrofoam which had the dimensions of the above design. A hole was created in the ground plane and Styrofoam to create the feed point. Next, a coaxial cable was trimmed such that the inner conductor was exposed at the tip and the outer conductor extended nearly to the tip and was left exposed up to slightly more than a centimeter away from the tip. The wire was threaded through the hole in the ground plane and Styrofoam and the inner conductor was soldered to the signal electrode at the feed point used in the simulations. The signal electrode was then attached to the foam and the outer conductor was soldered to the ground plane. One of the two prototypes can be seen in FIGS. 28A-28C. FIG. 28A illustrates a view from one end of the sensor, FIG. 28B illustrates a side view of the sensor, and FIG. 28C illustrates the bottom of the sensor.

Initial testing was done on POPEYE phantoms. "POPEYE" refers to a Posable Phantom for Electromatic Systems Evaluations. In this testing, the POPEYE phantoms represent an arm and a leg. Several test setups were measured. Each prototype was adhered to the leg or arm with scotch tape and attached to a network analyzer where the $|S_{21}|$ could be measured. First, the prototypes were placed on the flat surface of the POPEYE leg approximately 2.5 cm apart. At 10 MHz the $|S_{21}|$ is −16.87 dB.

After this baseline was established, it had to be evaluated whether these prototypes could satisfy the goals of Circle. One prototype was placed on the POPEYE arm and the other on the leg. The limbs were separated by approximately 5 cm and an $|S_{21}|$ measurement was taken. The limbs were then arranged so they were touching and another measurement was taken. At 10 MHz, the $|S_{21}|$ while touching was −28.59 and while separated it was −38.47. Despite the results showing a difference in touching vs not touching, the POPEYE phantom was not the best way to test this due to the rigid nature of the limbs which gives a very small contact area. By contrast, actual skin deforms, increasing the contact area. Also, the end of the limbs contains small amounts of metal threads in case the user wants to assemble the entire POPEYE body.

Implementations of the present disclosure were also tested using ground beef. It was determined that ground beef would be an effective phantom for testing touch vs no-touch $|S_{21}|$. Two five-pound 20% fat ground beef tubes were purchased and shaped into the approximated dimensions of two arms. The beef was wrapped in saran wrap and the sensors were placed on them. Measurements were taken with 10 cm, 3 cm, 1 cm, and 0 cm separation. Two measurements with 0 cm separation were taken, one with the arms lined up and another with a slight offset of the arms. At 10 MHz, the $|S_{21}|$ for the touching (no offset) arms is −24.26 dB and as the arms move further apart it reduces to −35.44 dB, −36.23 dB, and −38.03 dB. This shows an 11.18 dB difference between the touch and non-touch power transmission from one prototype sensor to another.

The simulations showed an 18.6 dB difference in $|S_{21}|$ between touching and non-touching arms and the testing showed an 11.18 dB difference. While the testing shows a smaller difference in S21, it is still large enough to detect a touch event. This difference could be attributed to the simulation incorporating a body or extra radiation from the tip of the co-axial cable soldered to the signal electrode. The present disclosure contemplates that HBC sensors (for example the sensors shown illustrated in FIGS. 28A-28C) can be used as part of the system illustrated in FIG. 1. This can include using the HBCs as wearable sensors 102 and using the HBCs with microcontrollers 104 and/or wireless transceivers 106 (e.g. Bluetooth) to implement the system 100. The present disclosure also contemplates that the size of the HBC sensors illustrated in FIGS. 28A-28C can be reduced.

Figure 29B:
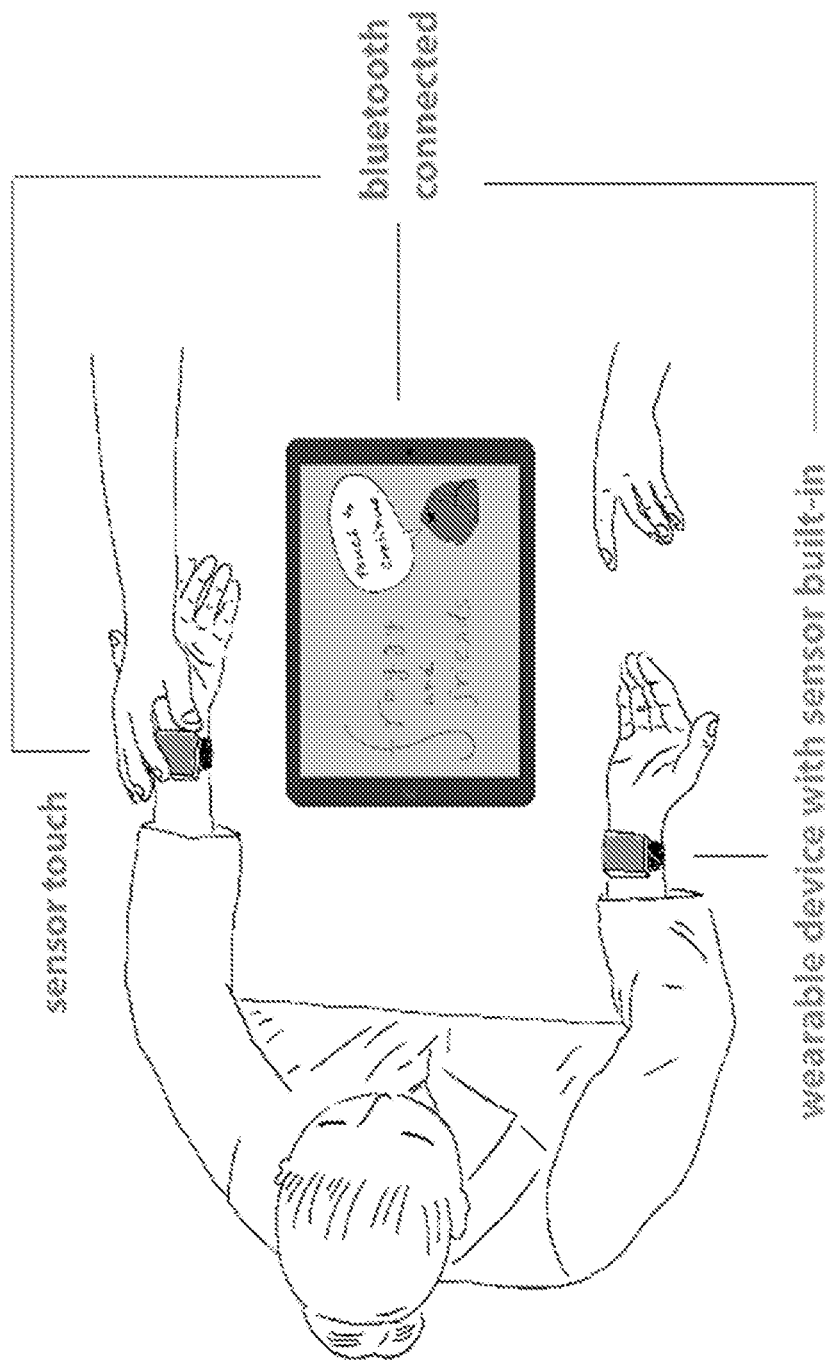
Figure 29C:
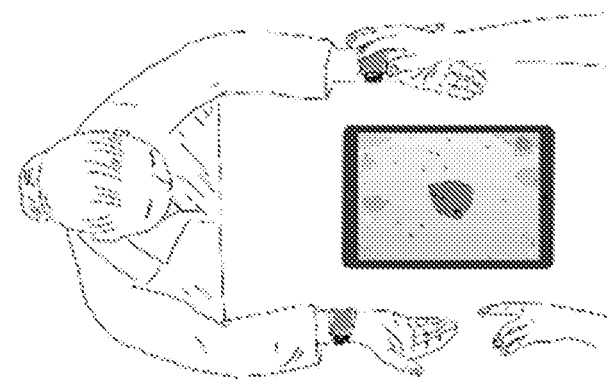
Figure 29C:
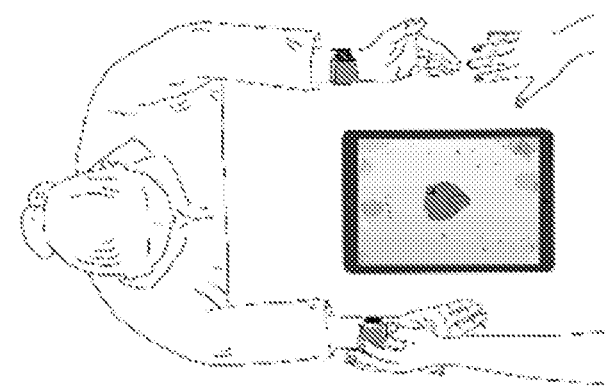
Figure 29C:
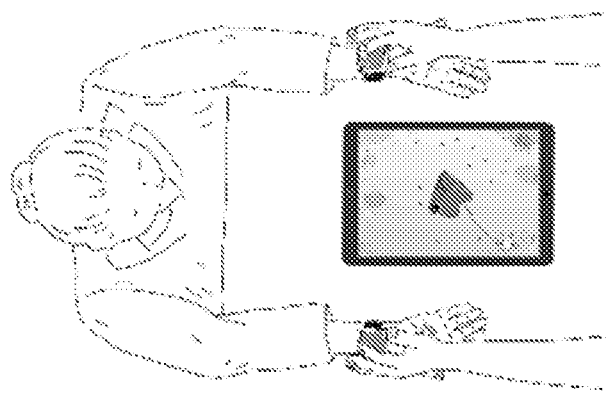

The microcontroller 104 can be configured to receive a sensor signal from the wearable sensor 102 and transmit a signal using the wireless transceiver 106. It should be understood that the wearable sensors 102 and microcontroller 104 described herein can be coupled through one or more communication links. In the examples, wearable sensors 102 and microcontroller 104 are coupled by a wireless link, e.g., via the wireless transceiver 106. This disclosure contemplates the communication links are any suitable communication link. For example, a communication link may be implemented by any medium that facilitates data exchange between the network elements including, but not limited to, wired, wireless and optical links. The signal can be received by a communication module 108 associated with a computing device 110. The computing device 110 can send and receive signals via the communication module 108. It should be understood that the microcontroller 104 and computing device 110 described herein can be coupled through one or more communication links. In the examples, microcontroller 104 and computing device 110 are coupled by a wireless link, e.g., via the communication module 108. This disclosure contemplates the communication links are any suitable communication link. For example, a communication link may be implemented by any medium that facilitates data exchange between the network elements including, but not limited to, wired, wireless and optical links. The computing device 110 can include a processor and memory, as well as any of the features shown in FIG. 30. The computing device can store instructions including instructions to perform steps associated with detecting a collaborative interaction event and controlling a game environment based on the collaborative interaction event. This can include receiving a signal from a microcontroller 104 via a wireless transceiver 106, analyzing the signal to detect a collaborative interaction event, and generating a control command based on the collaborative interaction event. The analysis can include comparing the received signals to a set of rules, and determining a control input based on the set of rules. A collaborative interaction event can be detected, for example, by either receiving or not receiving a signal via the communications module 108. If multiple signals are received by the communications modules, (e.g. from multiple transceivers corresponding to multiple wearable devices), the computing device 110 can determine a control input based on the combination of signals. The control command can be used to control a virtual environment (e.g. a game environment). As shown in FIGS. 29A-29C, different inputs or combinations of touch can be used to provide different control inputs. FIG. 29A illustrates an example of a skin-to-skin touch being used to control a game system, and FIG. 29B illustrates an example of a sensor touch being used to control the game system. FIG. 29C illustrates a non-limiting example of how different sensor touches can correspond to control inputs for the game. As shown in FIG. 29C, touching the right sensor can turn a virtual object (a frog in FIG. 29C) one direction, and touching the left sensor can turn the virtual object in the other direction. Finally, touching both sensors can cause a different control input. In FIG. 29C this is illustrated as the frog using its tongue to catch a fly in response to both sensors being touched. The control inputs shown in FIG. 29C are intended only as non-limiting examples, and different combinations of touch can be used to perform different functions than those shown in FIG. 29C.

Implementations of the present disclosure can be configured to facilitate interactive learning. Children with certain cognitive or learning disabilities, for example some children with autism, may not understand the effect of actions (i.e. the cause and effect relationship). A non-limiting way that the present disclosure can be used for interactive learning is that a directed game with a trained therapist can assist these children with making the connection between an action (e.g. pressing the sensor) and effect (e.g. a frog turning, a car changing lanes, or a rocket launching). Thus, the children can learn about cause and effect, and they then can make the connection that their actions cause something to happen in their environment. It should be understood that these are only non-limiting examples, and other interactive games and forms of interactive learning are contemplated by the present disclosure.

Additionally, implementations of the present disclosure can be used for therapy. For example, the interactive learning methods described herein can be considered a form of cognitive therapy. Additionally, occupational therapy may be either cognitively or physically directed but is often physically directed and can everyday objects to help children (and adults) learn or re-learn how to do things. Implementations of the present disclosure can be used to perform physical therapy. As a non-limiting example, playing the game described herein can be done as a form of physical therapy to help children with disabilities with motor skills. This can include both gross motor skills (e.g. moving their arm intentionally) and fine motor skills (e.g. moving their fingers intentionally) as they reach for the sensor on the therapists' arm or hand as well as touching the sensor deliberately with one or more fingers at the direction of the therapist. Again, it should be understood that these are only non-limiting examples of ways that the system can be used for therapy, and other therapeutic uses are contemplated by the present disclosure.

As shown in FIG. 1, implementations of the present disclosure can include multiple wearable sensors, multiple microcontrollers, and multiple wireless transceivers. However, it is also contemplated that only one wearable sensor, one wireless transceiver, or one microcontroller can be used, or that one microcontroller and/or wireless transceiver may correspond to multiple wearable sensors.

It is also contemplated that the wearable sensors shown in FIG. 1 may be placed on different users. For example, in an implementation of the present disclosure with two users, each user may have a wearable sensor, or one user can have both sensors. Further, in some implementations of the present disclosure, one user may have a wearable sensor configured to interact with a sensor on the other user.

In some implementations described herein, the microcontroller 104 or computing device 110 can analyze a pattern or combination of collaborative interaction events or sensor signals to generate the control command. For example, two simultaneous collaborative interaction events can correspond to a control command that is distinct from the control command that corresponds to either of the wearable sensors being activated separately. As shown in FIG. 29, two users can manipulate a virtual object (e.g. a game, as shown in FIG. 29) using wearable devices.

The computing device 110 or microcontroller 104 can also update the object's state. In some implementations, the computing device 110 or microcontroller 104 can generate display data for the object within the gaming environment, and the display data can be based off the sensor signal from the one or more wearable sensors 102. It should be understood that generating display data (e.g., visual change) is only an example of updating the object's state. For example, in other implementations, the computing device 110 or microcontroller 104 may manipulate the object and/or gaming environment in another manner (e.g., incrementing/decrementing a variable). Furthermore, the computing device can include a user interface module 112 and the display data can be graphically displayed on the user interface module 112. The display data can include, for example information about the user input, or representations of the activity or game that is being performed between the users of the system.

Example

In one non-limiting example implementation described herein, an implementation of the present disclosure was adapted to a target population of children with moderate to severe cognitive and/or physical developmental delays, who are cared for physically by their families but often lack social interaction and non-essential touch which may result in further delays. One implementation disclosed herein includes a game platform can give families a fun and constructive way to interact with their child. This additional visual and physical stimulation may result in increased cognitive and/or physical function.

Using wearable sensors (e.g. those shown in FIGS. 3-11), conductive fabrics, microcontrollers (e.g. those described in FIG. 1), and wireless communication (e.g. as shown in FIG. 1), the gaming platform can register and interpret "touch" as a way to interface with game apps and the devices they are installed on. In other words, touch is translated into player input. Thus, rather than interact with a computer (e.g. an iPad) directly, children and their parents interact with each other instead (FIGS. 29A-C). This platform engages both fully abled parents and disabled children equally in order to better focus on their shared physical expression. As touch can be registered from any part of the body, the platform scales across the disabled spectrum and allows for both active and passive participation by even the most severely disabled child.

An example implementation of how touch can be translated into game input is shown in FIG. 11A. The key component of this block diagram is a Bluetooth-Low-Energy (BLE) module 1102 that wirelessly transmits the status of its first General-Purpose Input/Output (GPIO) pin 1108. When touch is detected between the two players, the pin is set to a digital "1." By contrast, when no touch is detected, the pin is set to a digital "0." These signals can be captured by the iPad's Bluetooth and used to trigger the app. To realize the switch, seamless fabric-based solutions are proposed that rely on conductive threads (e-threads); when e-threads on the first player's hand (e.g., integrated in a patch or glove) are in contact with the e-threads on the second player's hand, a conductive path is established between the two, and the switch closes. Powering to the BLE module is provided via a coin cell battery that is further regulated to maintain a voltage within acceptable limits (typically 1.7V to 3.6V). When the switch is closed, it is this voltage that corresponds to the digital "1". FIG. 11B shows preliminary experimental results for conductive wires used to form a switch upon touch.

The non-limiting example of a game app that is designed to interface with the disclosed system employs 3 basic touch-based interactions: (1) touching hands on one side of the tablet will rotate the frog clockwise, (2) touching hands on the other side will rotate the frog counterclockwise, and (3) touching hands on both sides will make the frog stick out its tongue in order to catch a fly. The disclosed game can include collaborative or competitive elements, and collaborative games can offer an opportunity for disabled children to connect with their parents, friends, and family more fully.

A strength of collaborative games is that they distribute activities between players, and encourage them to work together to achieve a common goal.[11], [12] They promote social interaction, cognitive development, and can improve the quality of personal relationships.[4], [11]-[13] All of these benefits transfer directly to both disabled children and the fully-abled, and have the potential for impact that goes beyond the child and extends into the community.

Existing platforms for disabled gamers tend to address accessibility by seeking to normalize the experience between disabled and fully-abled gamers using a variety of gesture-capturing technologies including the one-switch, eye-tracking devices, and chin-controlled joysticks. For example, the GCM100 (Game Control Mixer) is an adaptive controller designed by Celtic Magic Assistive Technology that allows for the customization of standard accessibility switches and is compatible with several gaming devices including the XBOX, Play Stations 2/3/4, and the Nintendo Switch.[7] While this technology increases accessibility to the current game market, the user experience continues to be an isolated one. These technologies lack the opportunity for users to engage in collaborative touch, which can be remedied by implementations of the present disclosure.

Example Computing Device

It should be appreciated that the logical operations described herein with respect to the various figures may be implemented (1) as a sequence of computer implemented acts or program modules (i.e., software) running on a computing device (e.g., the computing device described in FIG. 30), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 30:
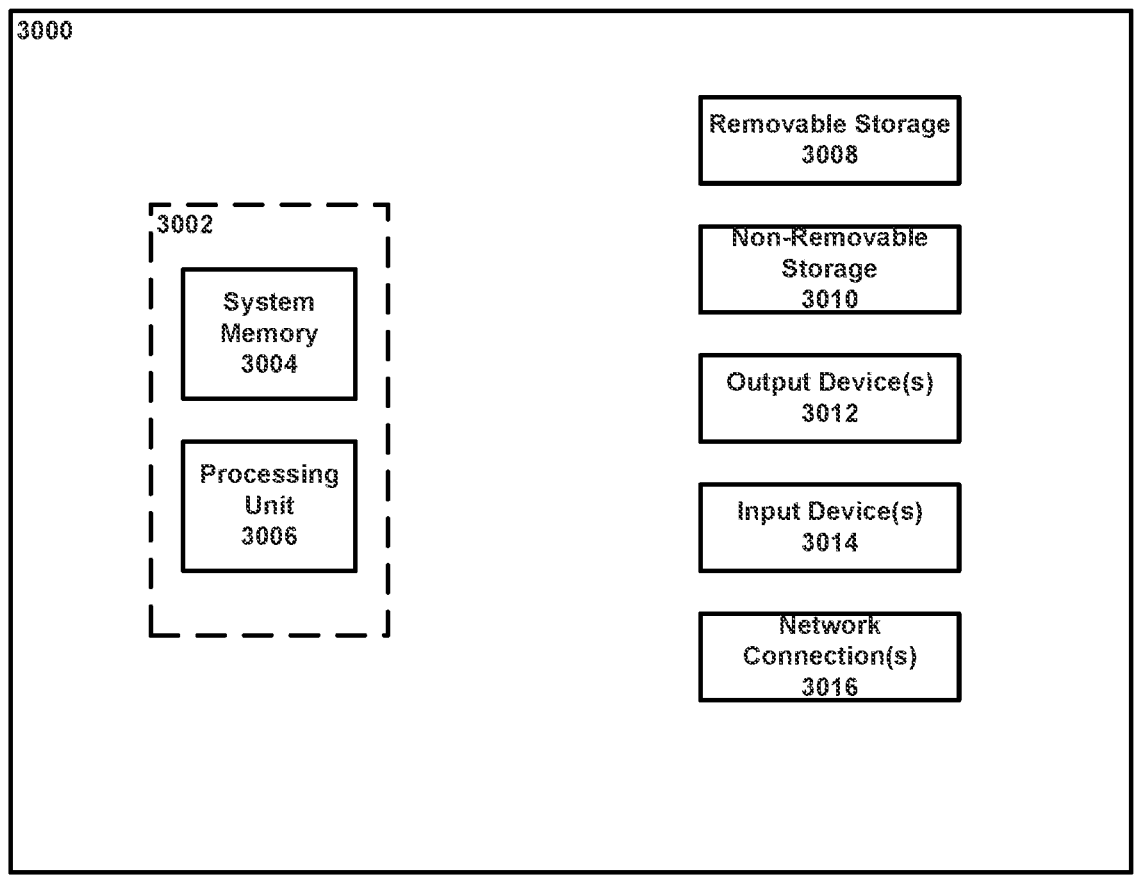
FIG. 30 illustrates an example computing device.

Referring to FIG. 30, an example computing device 3000 upon which the methods described herein may be implemented is illustrated. It should be understood that the example computing device 3000 is only one example of a suitable computing environment upon which the methods described herein may be implemented. Optionally, the computing device 3000 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In its most basic configuration, computing device 3000 typically includes at least one processing unit 3006 and system memory 3004. Depending on the exact configuration and type of computing device, system memory 3004 may be volatile (such as random access memory (RAM)), non-volatile (such as read-only memory (ROM), flash memory, etc.), or some combination of the two. This most basic configuration is illustrated in FIG. 5 by dashed line 3002. The processing unit 3006 may be a standard programmable processor that performs arithmetic and logic operations necessary for operation of the computing device 3000. The computing device 3000 may also include a bus or other communication mechanism for communicating information among various components of the computing device 3000.

Computing device 3000 may have additional features/functionality. For example, computing device 3000 may include additional storage such as removable storage 3008 and non-removable storage 3010 including, but not limited to, magnetic or optical disks or tapes. Computing device 3000 may also contain network connection(s) 3016 that allow the device to communicate with other devices. Computing device 3000 may also have input device(s) 3014 such as a keyboard, mouse, touch screen, etc. Output device(s) 3012 such as a display, speakers, printer, etc. may also be included. The additional devices may be connected to the bus in order to facilitate communication of data among the components of the computing device 3000. All these devices are well known in the art and need not be discussed at length here.

The processing unit 3006 may be configured to execute program code encoded in tangible, computer-readable media. Tangible, computer-readable media refers to any media that is capable of providing data that causes the computing device 3000 (i.e., a machine) to operate in a particular fashion. Various computer-readable media may be utilized to provide instructions to the processing unit 3006 for execution. Example tangible, computer-readable media may include, but is not limited to, volatile media, non-volatile media, removable media and non-removable media implemented in any method or technology for storage of information such as computer readable instructions, data structures, program modules or other data. System memory 3004, removable storage 3008, and non-removable storage 3010 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 3006 may execute program code stored in the system memory 3004. For example, the bus may carry data to the system memory 3004, from which the processing unit 3006 receives and executes instructions. The data received by the system memory 3004 may optionally be stored on the removable storage 3008 or the non-removable storage 3010 before or after execution by the processing unit 3006.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

REFERENCES

[1] K. R. Ginsburg, "The importance of play in promoting healthy child development and maintaining strong parent-child bonds," Pediatrics, vol. 119, no. 1, pp. 182-191, 2007.

[2] "The United Nations convention on the rights of the child," 1989.

[3] S. L. Nijhof et al., "Healthy play, better coping: The importance of play for the development of children in health and disease," Neurosci. Biobehav. Rev., vol. 95, pp. 421-429, 2018.

[4] M. Yogman, A. Garner, J. Hutchinson, K. Hirsh-Pasek, and R. M. Golinkoff, "The Power of Play: A Pediatric Role in Enhancing Development in Young Children," Pediatrics, 2018.

[5] ChildStats.gov, "Child population, Table 1," 2018. [Online]. Available: https://www.childstats.gov/americaschildren/tables.asp. [Accessed: 16-Nov-2018]. [6] L. Kraus, E. Lauer, R. Coleman, and A. Houtenville, "2017 Disability Statistics Annual Report," 2018.

[7] A. Goudie, S. Havercamp, L. Ronbom, and B. Jamieson, "Caring for children with disabilities in Ohio: The impact on families," 2010.

[8] E. L. Ardiel and C. H. Rankin, "The importance of touch in development," Paediatrics and Child Health. 2010.

[9] T. Field, "Touch for socioemotional and physical well-being: A review," Developmental Review. 2010.

[10] M. Gori, "Multisensory integration and calibration in children and adults with and without sensory and motor disabilities," Multisens. Res., 2015.

[11] L. Zhang, Z. Warren, A. Swanson, A. Weitlauf, and N. Sarkar, "Understanding Performance and Verbal-Communication of Children with ASD in a Collaborative Virtual Environment," J. Autism Dev. Disord., 2018.

[12] H. Zhao, A. R. Swanson, A. S. Weitlauf, Z. E. Warren, and N. Sarkar, "Hand-in-Hand: A Communication-Enhancement Collaborative Virtual Reality System for Promoting Social Interaction in Children with Autism Spectrum Disorders," IEEE Trans. Human-Machine Syst., 2018.

[13] E. D. Blume et al., "Parental perspectives on suffering and quality of life at end-of-life in children with advanced heart disease: An exploratory study," Pediatric Critical Care Medicine, vol. 15, no. 4. 2014.

[14] P. M. Sadler, G. Sonnert, Z. Hazari, and R. Tai, "Stability and volatility of STEM career interest in high school: A gender study," Sci. Educ., 2012.

[15] T. Buser, M. Niederle, and H. Oosterbeek, "Gender, competitiveness, and career choices," Q. J. Econ., 2014.

[16] TheAbleGamersFoundation, "Includification," Includification: A practical guide to game accessibility, 2012. [Online]. Available: https://www.includification.com/AbleGamers_Includification.pdf. [Accessed. 21-Nov-2018].

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A system, comprising:
   a wearable sensor configured to sense a collaborative interaction event, the wearable sensor comprising a human body communication sensor configured to sense skin-to-skin contact between two different users;
   a microcontroller comprising a wireless transceiver, wherein the microcontroller is in operable communication with the wearable sensor, and wherein the microcontroller is configured to:
      receive a sensor signal from the wearable sensor; and
      transmit, using the wireless transceiver, the sensor signal; and
   a computing device in operable communication with the microcontroller, wherein the computing device comprises a processor and a memory, the memory having computer-executable instructions stored thereon that, when executed by the processor, cause the processor to:
      receive the sensor signal from the microcontroller;
      analyze the sensor signal to detect the collaborative interaction event; and
         generate a control command in response to detecting the collaborative interaction event.

2. The system of claim 1, wherein the system further comprises a plurality of wearable sensors.

3. The system of claim 2, wherein a first wearable sensor of the plurality of wearable sensors is configured to be worn by a first user and a second wearable sensor of the plurality of wearable sensors is configured to be worn by a second user, and wherein at least one of the first wearable sensor or the second wearable sensor senses the collaborative interaction event.

4. The system of claim 2, wherein the memory has further computer-executable instructions stored thereon that, when executed by the processor, cause the processor to generate a different control command in response to detecting the collaborative interaction event at each of the plurality of wearable sensors.

5. The system of claim 2, wherein the memory has further computer-executable instructions stored thereon that, when executed by the processor, cause the processor to generate a different control command in response to detecting the collaborative interaction event at a distinct combination of the plurality of wearable sensors.

6. The system of claim 1, wherein the wearable sensor further comprises a pressure sensor.

7. The system of claim 6, wherein the wearable sensor further comprises a force sensitive resistor.

8. The system of claim 7, wherein the force sensitive resistor comprises a force-sensitive material and an embroidered material.

9. The system of claim 8, wherein the embroidered material comprises conductive thread.

10. The system of claim 1, wherein the wearable sensor further comprises a proximity sensor.

11. The system of claim 1, wherein the wearable sensor further comprises an impedance sensor.

12. The system of claim 1, wherein the wearable sensor further comprises an ultrasound sensor.

13. The system of claim 1, wherein the system comprises at least three wearable sensors and the at least three wearable sensors are human body communications sensors.

14. The system of claim 13, wherein the microcontroller is configured to simultaneously receive sensor signals from each of the at least three human body communication sensors.

15. The system of claim 1, wherein the control command is configured to manipulate an object within a gaming environment.

16. The system of claim 15, wherein the memory has further computer-executable instructions stored thereon that, when executed by the processor, cause the processor to update the object's state within the gaming environment.

17. The system of claim 15, wherein the computing device further comprises a user interface, and the memory has further computer-executable instructions stored thereon that, when executed by the processor, cause the processor to graphically display the display data on the user interface.

18. The system of claim 1, wherein the control command is configured to facilitate interactive learning or provide therapy.

* * * * *